United States Patent
Deguchi et al.

(10) Patent No.: US 7,163,429 B2
(45) Date of Patent: Jan. 16, 2007

(54) METHOD FOR MANUFACTURING ELECTRON-EMITTING MATERIAL

(75) Inventors: Masahiro Deguchi, Hirataka (JP); Masa-aki Suzuki, Osaka (JP); Akira Taomoto, Kyotanabe (JP); Toyokazu Ozaki, Nara (JP); Motoshi Shibata, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/028,329

(22) Filed: Jan. 4, 2005

(65) Prior Publication Data

US 2005/0127814 A1 Jun. 16, 2005

Related U.S. Application Data

(63) Continuation of application No. PCT/JP2004/002847, filed on Mar. 5, 2004.

(30) Foreign Application Priority Data

Mar. 6, 2003 (JP) .............................. 2003-059928

(51) Int. Cl.
  *H01J 9/02* (2006.01)
(52) U.S. Cl. .......................... 445/51; 445/50; 427/77; 427/226
(58) Field of Classification Search ........ 313/309–311, 313/495; 427/77, 226, 228; 445/50, 51
See application file for complete search history.

(56) References Cited

U.S. PATENT DOCUMENTS 5,672,938 A * 9/1997 Jones .......................... 313/504
5,977,697 A * 11/1999 Jin et al. ..................... 313/310
6,713,947 B1 * 3/2004 Hirasawa et al. ........... 313/313
6,843,919 B1 * 1/2005 Klabunde et al. ........... 210/660
2004/0050816 A1 * 3/2004 Asakawa et al. .............. 216/2

FOREIGN PATENT DOCUMENTS

| JP | 7-335116 A | 12/1995 |
| JP | 9-199000 A | 7/1997 |
| JP | 2001-57146 A | 2/2001 |
| JP | 2001-96499 A | 4/2001 |
| JP | 2002-170480 A | 6/2002 |
| JP | 2002-343280 A | 11/2002 |
| JP | 2004-39325 A | 2/2004 |
| JP | 2004-39519 A | 2/2004 |

* cited by examiner

*Primary Examiner*—Mariceli Santiago
*Assistant Examiner*—Matt Hodges
(74) *Attorney, Agent, or Firm*—McDermott Will & Emery LLP

(57) ABSTRACT

A principal object of the present invention is to provide efficiently an electron-emitting element. The electron-emitting element includes: (a) a substrate, (b) a lower electrode layer provided on the substrate, (c) an electron-emitting layer provided on the lower electrode layer, and (d) a control electrode layer so disposed as not to be in contact with the electron-emitting layer, wherein the electron-emitting layer includes an electron-emitting material for emitting electrons in an electric field, (1) the electron-emitting material being a porous body having a 3D-network structure skeleton, (2) the 3D-network structure skeleton being composed on an inner portion and a surface portion, (3) the surface portion comprising an electron-emitting component, (4) the inner portion being occupied by (i) at least one of an insulating material and a semiinsulating material, (ii) an empty space, or (iii) at least one of an insulating material and a semiinsulating material and an empty space.

16 Claims, 11 Drawing Sheets

METHOD FOR MANUFACTURING ELECTRON-EMITTING MATERIAL

This application is a continuation of PCT/JP2004/002847, filed on Mar. 5, 2004.

TECHNICAL FIELD

The present invention relates to an electron-emitting element, a fluorescent light-emitting element, and an image displaying device, using an electron-emitting material having a three dimensional network (3D-network) skeleton as an electron-emitting layer.

BACKGROUND ART

Electron emission effects from the solid surfaces include: (1) thermionic emission in which electrons are emitted due to heat, and (2) field electron emission in which electrons are emitted due to electric field. In recent years, cold cathode emitters of a field emission type (FE emitters) which do not require heating have attracted attention. For example, Spindt-type and thin-film emitters are known as such FE emitters.

Spindt-type electron-emitting elements are the basic type of FE emitters. The operation thereof is based on causing the emission of electrons in vacuum by applying a high electric field ($>1\times10^9$ V/m) to a distal end region of a fine conical emitter tip formed from a metal material with a high melting point, such as silicon (Si) and molybdenum (Mo) (see, for example, U.S. Pat. No. 3,665,241).

A thin-film electron-emitting element represents the development of the Spindt-type electron-emitting element. Thin-film electron-emitting elements do not use the fine conical structure typical for the Spindt-type elements and electrons are emitted from a flat emitter. In this element, because the emitter has a flat shape, an electric field concentration effect obtained with the conical structure cannot be expected. For this reason, a limitation is placed on the emitter materials that can be used in the thin-film electron-emitting elements.

Carbon materials such as amorphous carbon films, diamond, and carbon nanotubes (CNT) are known as materials for emitters (for example, see, Japanese Unexamined Patent Publication Nos. H8-505259, H7-282715, and H10-012124). Among the aforementioned carbon materials, CNT is a fine tubular material (diameter in the order of several to several tens of nanometer) having a shape in which a graphen sheet composed only of carbon is wound into a cylinder. This material is electrically conductive and has a sharp form with a large aspect ratio. For this reason, it is the most promising as an effective emitter material among all the carbon materials.

Furthermore, a field electron-emitting element is known which comprises an emitter electrode for emitting electrons under applied electric field, an electron accelerating layer, and an extraction electrode, wherein the electron accelerating layer is composed of a porous silica film (Japanese Unexamined Patent Publication No. 2000-285797). A material obtained by precipitating graphite or silicon inside pores is used as the porous silica film, but it is assumed that it will be disposed in contact with the extraction electrode.

DISCLOSURE OF THE INVENTION

In the Spindt-type electron-emitting element, electrons are emitted by an electric field concentration effect relating to a distal end portion of a sharp conical structure by using a semiconductor process. For this reason, characteristics of such an element are greatly affected by the shape of the distal end or surface state. Therefore, stable desired characteristics are difficult to obtain. Furthermore, the aforementioned process places a limitation on the materials that can be used. Moreover, a display with a large surface area is difficult to produce from such elements.

By contrast, in the thin-film electron-emitting element, it is not that necessary to conduct strict control of the emitter portion, unlike the Spindt-type electron-emitting element. For this reason, thin-film electron-emitting elements seem to be superior to the Spindt-type electron-emitting elements in terms of stability and increase in surface area. However, as described above, the number of emitter materials which have desired characteristics is limited. Thus, they cannot be used as emitter materials unless the properties or microstructure thereof are controlled.

As described above, a variety of carbon materials have been studied as promising candidates for the emitter materials, but in materials other than CNT, sufficient characteristics have not yet been obtained. For this reason, it was necessary to rely on CNT as the emitter material.

However, the CNT which are presently considered as an optimum material are expensive and can hardly be considered as a material suitable for the manufacture on an industrial scale. Another problem associated with the CNT is that they are in a powdered form and are therefore difficult to handle.

Therefore, it is a main object of the present invention to resolve the above-described problems inherent to the related technology and to provide effectively an electron-emitting element demonstrating excellent performance equal or superior to that of the related technology.

Thus, the present invention relates to the below-described electron-emitting element, fluorescent light-emitting element, and image displaying device.

1. An electron-emitting element comprising: (a) a substrate, (b) a lower electrode layer provided on said substrate, (c) an electron-emitting layer provided on said lower electrode layer, and (d) a control electrode layer so disposed as not to be in contact with said electron-emitting layer,
  wherein said electron-emitting layer comprises an electron-emitting material for emitting electrons in an electric field;
  (1) said electron-emitting material being a porous body having a 3D-netwok structure skeleton, (2) the 3D-network structure skeleton being composed of an inner portion and a surface portion, (3) the surface portion comprising an electron-emitting component, (4) the inner portion being occupied by (i) at least one of an insulating material and a semiinsulating material, (ii) an empty space, or (iii) an empty space and at least one of an insulating material and a semiinsulating material.

2. The electron-emitting element according to above 1, wherein said electron-emitting material is exposed on the surface of said electron-emitting layer.

3. The electron-emitting element according to above 2, wherein said electron-emitting layer consist of an electron-emitting material for emitting electrons in an electric field.

4. The electron-emitting element according to above 1, wherein said electron-emitting layer has electric conductivity.

5. The electron-emitting element according to above 1, wherein said electron-emitting layer is obtained by baking a coating film of a paste containing a powdered electron-emitting material.

6. The electron-emitting element according to above 1, wherein the substantially entire inner portion is composed of an inorganic oxide.

7. The electron-emitting element according to above 1, wherein the substantially entire inner portion is composed of an empty space.

8. The electron-emitting element according to above 1, wherein the electron-emitting component is a carbon material.

9. The electron-emitting element according to above 8, wherein the carbon material has one or more π bonds.

10. The electron-emitting element according to above 8, wherein the carbon material contains graphite as the main component.

11. A fluorescent light-emitting element comprising an anode portion having a fluorescent layer and an electron-emitting element, said anode portion and electron-emitting element being so disposed that the electrons emitted from said electron-emitting element cause said fluorescent layer to emit light, wherein said electron-emitting element is the element according to above 1.

12. An image displaying device comprising an anode portion having a fluorescent layer and a plurality of electron-emitting elements disposed two-dimensionally, said anode portion and electron-emitting elements being so disposed that the electrons emitted from said electron-emitting elements cause said fluorescent layer to emit light, wherein said electron-emitting element is the element claimed in above 1.

13. A method for manufacturing an electron-emitting material, (1) the electron-emitting material being a porous body having a 3D-network structure skeleton, (2) the 3D-network structure skeleton being composed on an inner portion and a surface portion, (3) the surface portion comprising an electron-emitting component, (4) the inner portion being composed of (i) at least one of an insulating material and a semiinsulating material, (ii) an empty space, or (iii) an empty space and at least one of an insulating material and a semiinsulating material, wherein the method comprises a step A of obtaining an electron-emitting material composed of a carbon-containing material by adding a carbon material to a gel of an inorganic oxide having a 3D-network structure skeleton.

14. The manufacturing method according to above 13, further comprising a step of removing the inorganic oxide partially or entirely from the carbon-containing material.

15. The manufacturing method according to above 13, wherein a dry gel is used as the gel of the inorganic oxide and the step of obtaining a porous body as the carbon-containing material by adding a carbon material to the dry gel is implemented as the step A.

16. The manufacturing method according to above 13, wherein the carbon precursor contains an organic polymer.

17. The manufacturing method according to above 14, wherein a carbon precursor contains an organic polymer.

18. The manufacturing method according to above 16, wherein the organic polymer has one or more carbon-carbon unsaturated bonds.

19. The manufacturing method according to above 16, wherein the organic polymer has one or more aromatic rings.

20. The manufacturing method according to above 16, wherein the organic polymer is at least one of phenolic resins, polyimides, and polyacrylonitrile.

21. A method for manufacturing an electron-emitting material, (1) the electron-emitting material being a porous body having a 3D-network structure skeleton, (2) the 3D-network structure skeleton being composed of an inner portion and a surface portion, (3) the surface portion comprising an electron-emitting component, (4) the inner portion being composed of (i) at least one of an insulating material and a semiinsulating material, (ii) an empty space, or (iii) an empty space and at least one of an insulating material and a semiinsulating material, wherein the method comprises a step B of obtaining an electron-emitting material composed of a carbon-containing material by adding a carbon precursor to a gel of an inorganic oxide having a 3D-network structure skeleton and carbonizing the carbon precursor containing gel thus obtained.

22. The manufacturing method according to above 21, further comprising a step of removing the inorganic oxide partially or entirely from the carbon precursor containing gel.

23. The manufacturing method according to above 21, wherein a wet gel is used as the gel of the inorganic oxide and a step of obtaining a porous body as the carbon-containing material by adding a carbon precursor to said wet gel and drying the carbon precursor containing gel thus obtained to obtain a carbon precursor containing dry gel, and then carbonizing said dry gel is carried out as the step B.

24. The manufacturing method according to above 22, wherein a wet gel is used as the gel of the inorganic oxide and a step of obtaining a porous body as the carbon-containing material by adding a carbon precursor to said wet gel, removing the inorganic oxide partially or entirely from the carbon precursor containing gel thus obtained, and then carbonizing the obtained material is carried out as the step B.

25. The manufacturing method according to above 21, wherein the carbon precursor contains an organic polymer.

26. The manufacturing method according to above 22, wherein the carbon precursor contains one or more types of organic polymer.

27. The manufacturing method according to above 25, wherein the organic polymer has one or more carbon-carbon unsaturated bonds.

28. The manufacturing method according to above 25, wherein the organic polymer has one or more aromatic rings.

29. The manufacturing method according to above 25, wherein the organic polymer is at least one of phenolic resins, polyimides, and polyacrylonitrile.

Figure 1:
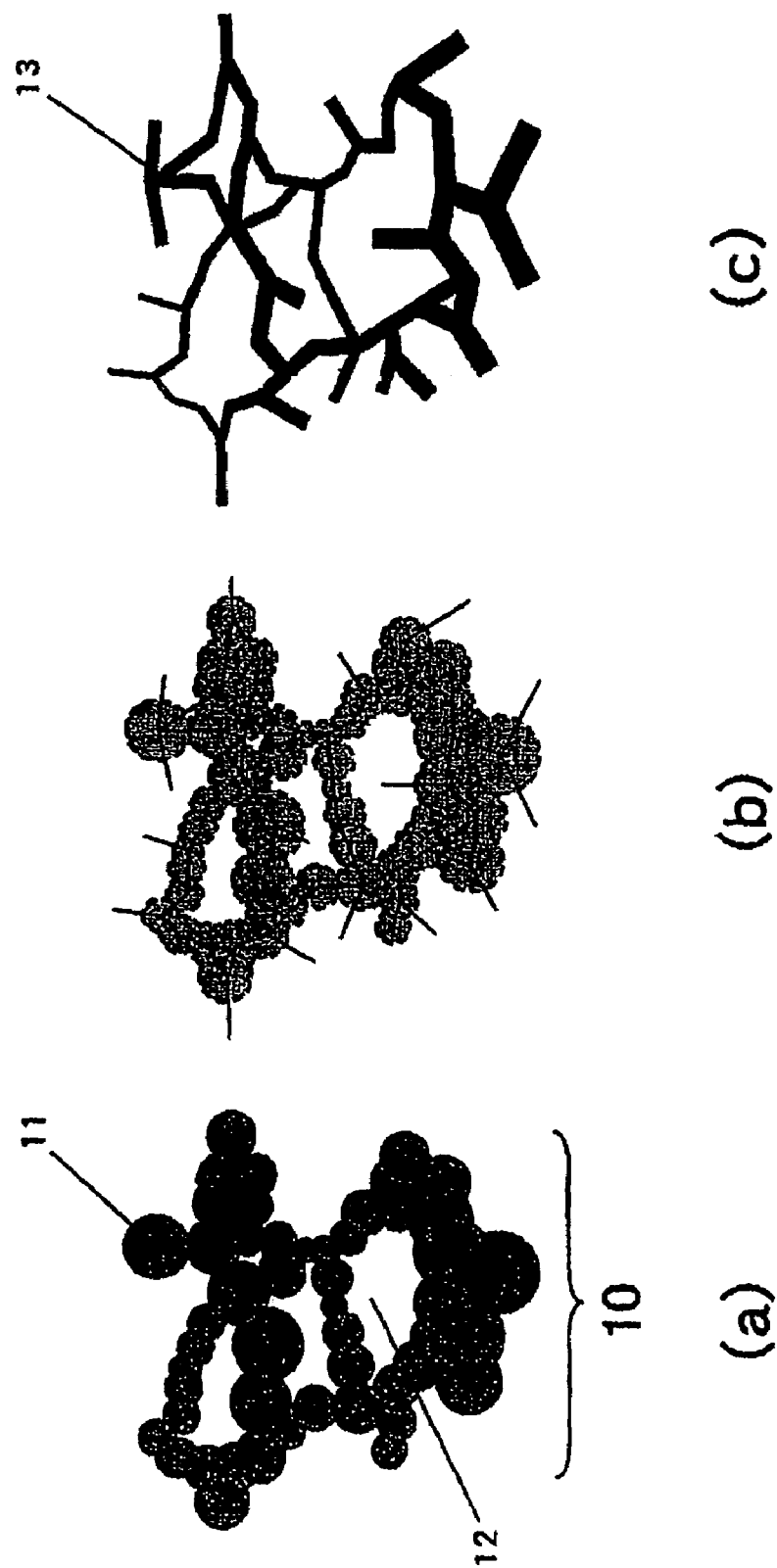
FIG. 1 a schematic drawing illustrating a model of a fine structure of a 3D-network structure skeleton.

| KEYS | |
|---|---|
| 10 | GEL STRUCTURE (POROUS BODY) |
| 11 | FINE PARTICLES |
| 12 | FINE PORES |
| 13 | DENDRITIC DIAGRAM REPRESENTING A 3D-NETWORK SKELETON |
| 20 | ELECTRON-EMITTING MATERIAL (COMPOSITE STRUCTURE OF ELECTRON-EMITTING COMPONENT FILM) |
| 21 | ELECTRON-EMITTING COMPONENT |
| 22 | INSULATING MATERIAL (OR SEMIINSULATING MATERIAL) |
| 30 | ELECTRON-EMITTING MATERIAL (HOLLOW ELECTRON-EMITTING MATERIAL STRUCTURE) |
| 31 | ELECTRON-EMITTING COMPONENT |
| 32 | HOLLOW SPACE |
| 80 | ELECTRON-EMITTING ELEMENT |
| 81 | SUBSTRATE |
| 82 | ELECTRODE LAYER |
| 83 | ELECTRON-EMITTING LAYER |
| 84 | CONTROL ELECTRODE LAYER |
| 85 | INSULATING LAYER |
| 86 | CONTROL POWER SOURCE |
| 87 | PROTRUDING PORTION |
| 88 | SPACE REGION |
| 90 | ELECTRON-EMITTING ELEMENT |
| 91 | SUBSTRATE |
| 92 | ELECTRODE LAYER |
| 93 | ELECTRON-EMITTING LAYER |
| 94 | CONTROL ELECTRODE LAYER |
| 95 | INSULATING LAYER |
| 96 | CONTROL POWER SOURCE |
| 100 | ANODE PORTION |
| 97 | FLUORESCENT BODY LAYER |
| 98 | ANODE ELECTRODE LAYER |
| 99 | FRONT SUBSTRATE |
| 910 | ACCELERATING POWER SOURCE |
| 911 | VACUUM CONTAINER |
| 101 | SUBSTRATE |
| 102 | ELECTRODE LAYER |
| 103 | ELECTRON-EMITTING LAYER |
| 104 | CONTROL ELECTRODE LAYER |
| 105 | FLUORESCENT LAYER |
| 106 | ANODE ELECTRODE LAYER |
| 107 | FRONT SUBSTRATE |
| 108, 109 | OPERATING DRIVER |
| 201 | POROUS SILICA FILM |
| 202 | ELECTRICALLY CONDUCTIVE SUBSTRATE |
| 203 | UPPER ELECTRODE. |

BEST MODE FOR CARRYING OUT THE INVENTION

1. Electron-Emitting Element

The electron-emitting element of the present invention is an electron-emitting element comprising: (a) a substrate, (b) a lower electrode layer provided on the substrate, (c) an electron-emitting layer provided on the lower electrode layer, and (d) a control electrode layer so disposed as not to be in contact with the electron-emitting layer, wherein the electron-emitting layer comprises an electron-emitting material for emitting electrons in an electric field, (1) the electron-emitting material being a porous body having a 3D-network structure skeleton, (2) the 3D-network structure skeleton being composed of an inner portion and a surface portion, (3) the surface portion comprising an electron-emitting component, (4) the inner portion being composed of (i) at least one of an insulating material and a semiinsulating material, (ii) an empty space, or (iii) an empty space and at least one of an insulating material and a semiinsulating material.

First, the electron-emitting material constituting the electron-emitting layer of the element in accordance with the present invention and the method for manufacture thereof will be described.

(1) Electron-Emitting Material and Method for Manufacture thereof (1-1) Electron-Emitting Material The electron-emitting material in accordance with the present invention (will be also referred to hereinbelow as "material in accordance with the present invention") emits electrons in an electric field. More specifically, a material satisfying the following four conditions is used.

The electron-emitting material: (1) is a porous body having a 3D-network structure skeleton, (2) the 3D-network structure skeleton is composed on an inner portion and a surface portion, (3) the surface portion comprises an electron-emitting component, (4) the inner portion is occupied by (i) at least one of an insulating material and a semiinsulating material, (ii) an empty space, or (iii) an empty space and at least one of an insulating material and a semiinsulating material.

No limitation is placed on the shape or size of the electron-emitting material and they may be appropriately determined according to the application or object of use. Further, the material in accordance with the present invention may be subjected to comminuting, provided the four aforementioned conditions are satisfied. For example, the materials in accordance with the present invention also include a powder with a mean particle size of 0.5 µm or more and 50 µm or less.

[Porous Body]

The 3D-network structure skeleton of the porous body mentioned above may be a skeleton with a three-dimensional 3D-network structure. This skeleton preferably has multiple pores. In the preferred skeleton, fine solid components (linear bodies) having a size of about 2 to 30 nm are intertwined as a 3D-network configuration, and the gaps therebetween are empty. The porous body is a solid substance having continuous or individual fine pores. Such a body can be produced by a variety of methods such as molding of a starting material powder, sintering the powder, chemical foaming, physical foaming, and sol-gel process, as described hereinbelow.

The bulk density, BET specific surface area, and mean pore size of the porous body can be appropriately determined by the type of the insulating material, application of the porous body, and method of use. The bulk density may be appropriately determined usually from within a range of 10 to 500 kg/m$^3$, in particular, 50 to 400 kg/m$^3$. The specific surface area can be appropriately set usually from within a range of about 50 to 1500 m$^2$/g, in particular, 100 to 1000 m$^2$/g. The specific surface area is a value measured by a Brunauer-Emmet-Teller method (abbreviated below as "BET method") which is a nitrogen adsorption method.

Furthermore, the mean pore diameter of the porous body can be appropriately determined usually from within a range of 1 to 1000 nm, in particular, 5 to 50 nm.

[Surface Portion of Porous Body]

The surface portion comprises an electron-emitting component. The electron-emitting component may be any component capable of emitting electrons in an electric field (field emission function). It is especially preferred that semiconductor materials with a wide band gap and materials with a small work function (small electron affinity) be used.

Examples of specific materials include alkali metals such as cesium and oxides thereof; alkaline earth metals such as beryllium, calcium, magnesium, strontium, barium, and oxides thereof; carbon materials such as carbon blacks (e.g. acetylene blacks and ketjen blacks), active carbon, artificial graphite, natural graphite, carbon fibers, pyrolyzed carbon, glassy carbon, impermeable carbon, special carbon, and coke; nitrides such as aluminum nitride and boron nitride; and mixed-crystal materials thereof. These materials may used singly or in combination of two ore more thereof.

Among them, carbon materials are especially preferred. Carbon materials may be crystalline or amorphous. When the carbon material is crystalline, no specific limitation is placed on the crystal structure thereof. For example, it may have a diamond structure or a graphite structure. Moreover, carbon nanotubes, carbon nanohorns, carbon nanoribbons, carbon nanocoils, and carbon nanocapsule can be also used as the carbon material.

A carbon material produced by carbonization of starting materials for the carbon material and/or a carbon material obtained by carbonization of an organic polymer serving as a carbon precursor are preferably used as the aforementioned carbon material. The advantage of such materials is that they can be readily formed on the gel skeleton surface and that carbon structure and properties can be freely controlled by changing the formation conditions, carbonization conditions or the like.

In the surface portion, in particular, in a state called a negative electron affinity (NEA) or a state with an extremely small positive electron affinity, the energy level at the edge of the conduction band where electrons can be present is higher than or the same as the vacuum level. As a result, the electrons can be very easily emitted from the electron-emitting surface into vacuum.

The thickness of the surface portion can be appropriately determined according to the type of the electron-emitting component. Usually it is about 3 to 100 nm, preferably 3 to 20 nm. This thickness can be controlled by changing the conditions of the below-described manufacturing process.

[Inner Portion of Porous Body]

The inner portion is occupied by (i) at least one of an insulating material and a semiinsulating material, (ii) an empty space, or (iii) at least one of an insulating material and a semiinsulating material (both are referred to hereinbelow as "insulating material") and an empty space.

Thus, in the porous body, the content (occupation ratio) of the insulating material in the inner portion of the porous body is within a range of 0 vol. % or more to 100 vol. % or less. Therefore, the scope of the present invention includes the following cases: (i) the inner portion of the porous body is substantially entirely formed from an insulating material, (ii) the inner portion of the porous body is substantially entirely an empty space (hollow portion), and (iii) part of the inner portion of the porous body is an insulating material and the remaining part is an empty space.

The insulating material can be selected from well-known insulating materials or semiinsulating materials. Typically, electric conductivity thereof may be $10^{-3}$ S/cm or less (27° C.).

In particular, in accordance with the present invention, it is preferred that inorganic oxides be used because the can easily form a porous body having a 3D-network structure skeleton. Examples of suitable inorganic oxides include silicon oxide, aluminum oxide, titanium oxide, vanadium oxide, iron oxide, zirconium oxide, and magnesium oxide, mixtures (mixed oxides) thereof, and composite oxides. Those oxides can be used singly or in combinations of two or more thereof.

Further, in cases above (i) and (iii), the ratio of the insulating material and electron-emitting component can be appropriately determined according to the type of the insulating material or electron-emitting component and the application of the porous body.

<Embodiment 1>

The preferred embodiment of the electron-emitting material will be described hereinbelow with reference to the drawings. In accordance with the present invention, no specific limitation is placed on the method for forming a porous body having a 3D-network structure skeleton. Among such methods, a sol-gel method is described as the preferred working example of the present invention because it is a simple method. Therefore, the explanation will be focused on the process employing a sol-gel method.

FIG. 1(a) illustrates schematically the microstructure of a porous body 10 (a 3D-network skeleton structure body having a multiplicity of fine pores) produced by a sol-gel method. In this porous body, aggregates of fine particles 11 having a diameter of 2 to 30 nm are combined together in a three-dimensional network to form a porous structure comprising a large number of fine pores (vapor phase) 12 with a size of 1 µm or less, while maintaining a solid shape. As a result, a low-density body with a porosity of 50% or more can be obtained and, therefore, a porous structure with a large specific surface area can be obtained. For example, a porous body with a specific surface area measured by BET method of 100 $m^2$/g or more can be obtained.

In FIG. 1(b), the connection state of solid portions (skeleton portions) of the porous body shown in FIG. 1(a) is represented with lines. It is clear that the skeleton portion has a 3D-network structure composed of a random network.

FIG. 1(c) is a diagram obtained by extracting only the lines representing the 3D-network skeleton, based on FIG. 1(b). The porous structure composed of associations of fine particles will be simulated by such dendritic lines 13.

FIG. 1 illustrates an example of a porous structure composed of fine particle associations, but the present invention is not limited to this example. For example, porous structures having a multiplicity of fine pores, such as an association of linear substances and a structure in which beehive holes are opened in a larger structural body may be used. Any reference made hereinbelow to the structure depicted in FIG. 1(c) will be assumed to include those structures.

<Embodiment 2>

Figure 2:
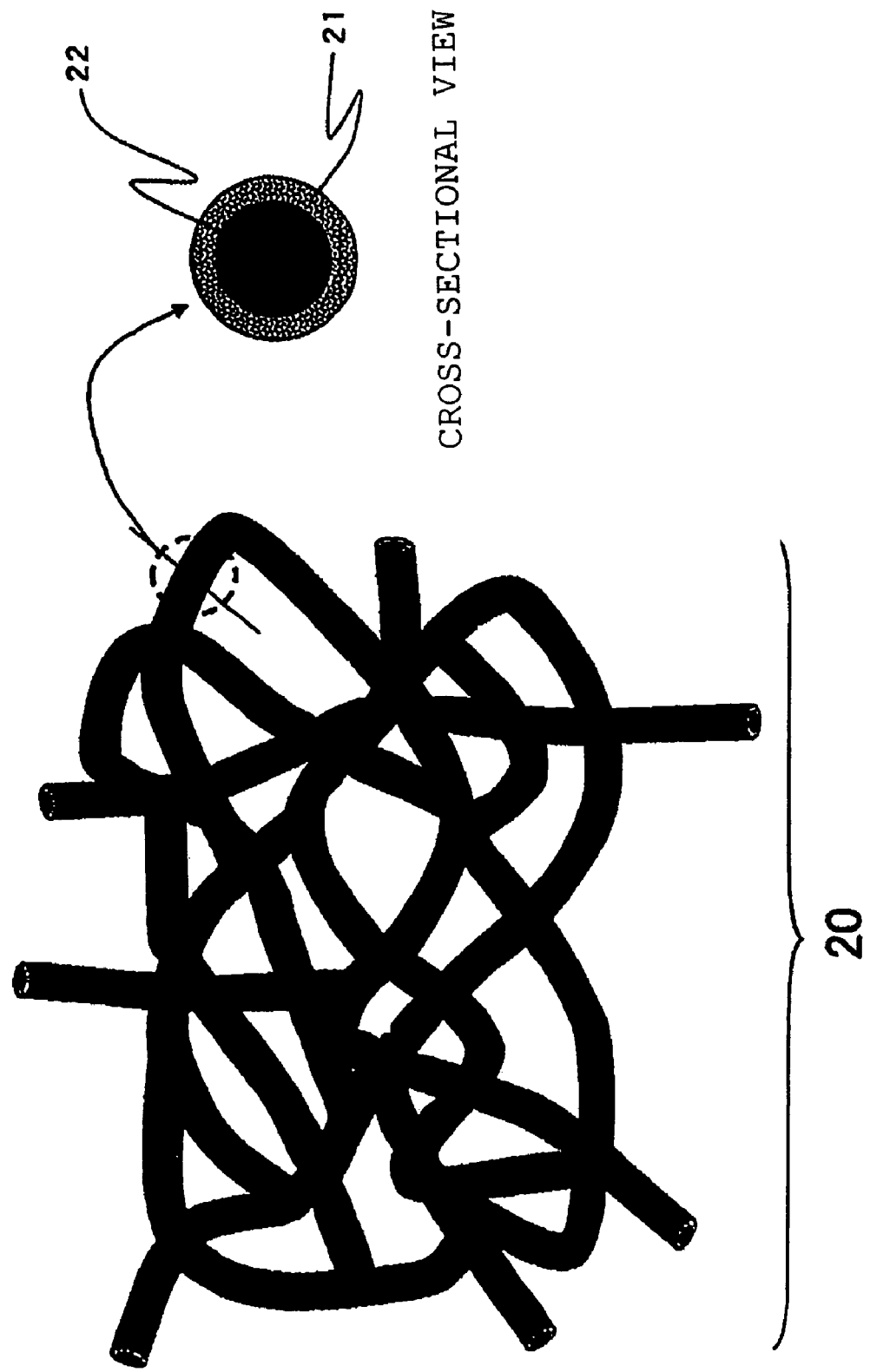
FIG. 2 a schematic drawing illustrating a 3D-network skeleton composite structure having an electron-emitting component film.

FIG. 2 shows the preferred embodiment of the electron-emitting material. The first configuration of a material 20 in accordance with the present invention represents a structure 21 composed of a fine 3D-network skeleton, such as shown in FIG. 2, with a coating of an electron-emitting component. Thus, a 3D-network skeleton composed of an insulating material (or semiinsulating material) 22 is employed as a core and the surface of the skeleton is coated with an electron-emitting component 21.

<Embodiment 3>

Figure 3:
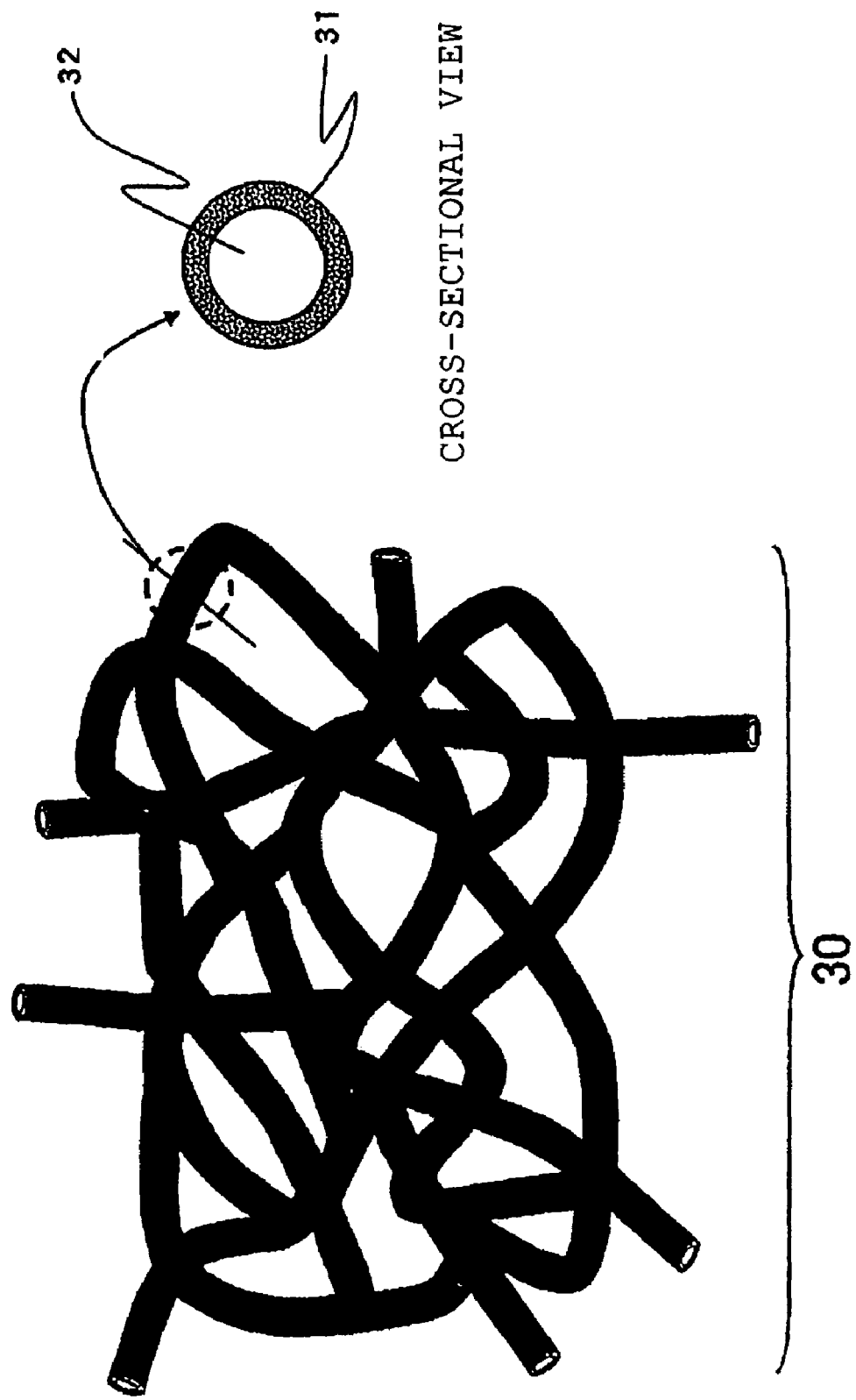
FIG. 3 a schematic drawing illustrating an electron-emitting component structure composed having a 3D-network skeleton, wherein the skeleton is hollow.

A second configuration of the electron-emitting material in accordance with the present invention is shown in FIG. 3. This material is composed of a 3D-network skeleton structure and is an electron-emitting material 30 composed of an electron-emitting component 31, wherein the inner portion of the skeleton is a hollow space 32. Thus, this material has a structure composed of intertwined tubular skeletons.

In this structure, the inner portion of the 3D-network skeleton structure is the hollow space 32. Therefore, the specific surface area is higher than that when no hollow space is present. Thus, the performance can be further improved with respect to that provided for by the 3D-network skeleton structure. As a result, such a material is suitable for applications requiring higher electron emission capability.

(1-2) Method for the Manufacture of Electron-Emitting Material

No specific limitation is placed on the method for the manufacture of the electron-emitting material. For example, when the insulating material and electron-emitting component are an inorganic oxide and a carbon material, respectively, the electron-emitting material can be advantageously manufactured by the below-described first method and second method.

The first method is a method for the manufacture of an electron-emitting material, (1) the electron-emitting material being a porous body having a 3D-network structure skeleton, (2) the 3D-network structure skeleton being composed of an inner portion and a surface portion, (3) the surface portion comprising an electron-emitting component, (4) the inner portion is composed of (i) at least one of an insulating material and a semiinsulating material, (ii) an empty space, or (iii) an empty space and at least one of an insulating material and a semiinsulating material, wherein the method comprises at least (1) a step A of obtaining a carbon-containing material by adding a carbon material to a gel of an inorganic oxide having a 3D-network structure skeleton, or (2) a step B of obtaining a carbon-containing material by adding a carbon precursor to a gel of an inorganic oxide having a 3D-network structure skeleton and carbonizing the carbon precursor containing gel thus obtained.

The second method is the above-described first method further comprising a step of removing the inorganic oxide partially or entirely from the carbon-containing material or a material containing a carbon precursor.

First Method

The first method is a manufacturing method comprising at least (1) a step A of obtaining a carbon-containing material by adding a carbon material to a gel of an inorganic oxide having a 3D-network structure skeleton or (2) a step B of obtaining a carbon-containing material by adding a carbon precursor to a gel of an inorganic oxide having a 3D-network structure skeleton and carbonizing the carbon precursor containing gel thus obtained.

With the first method, an electron-emitting material (porous body) can be advantageously manufactured in which the inner portion of the porous body is substantially entirely occupied by an inorganic oxide. With the first method, either the process A or process B is selectively implemented.

[Process A]

Process A is a process for providing carbon to the aforementioned gel and obtaining a carbon-containing material.

No limitation is placed on the inorganic oxide gel having a 3D-network structure skeleton, which is a starting material, provided it has a 3D-network structure skeleton. Furthermore, depending on whether a gel contains a liquid (solvent), there are two types of gels: a wet gel (a gel containing a solvent in the gaps of the 3D-network structure skeleton) and a dry gel (gel in which substantially no solvent is present in the gaps of the 3D-network structure skeleton). Gels of both types can be used in accordance with the present invention.

Furthermore, the type of inorganic oxide can be appropriately selected from metal oxides of a variety of types according to the application of the electron-emitting material and method of use. In particular, in order to form a 3D-network structure skeleton, it is especially preferred that the selected inorganic oxide can be formed by a sol-gel method. Examples of suitable compounds include silicon oxide (silica), aluminum oxide (alumina), titanium oxide, vanadium oxide, tantalum oxide, iron oxide, magnesium oxide, zirconium oxide, zinc oxide, tin oxide, cobalt oxide, and also mixed oxides and double oxides thereof. Among them at least one of silica and alumina is preferred because it allows a wet gel to be formed easily by a sol-gel method.

A gel manufactured by a known method can be used. In particular, as described above, a gel prepared by a sol-gel method can be used advantageously because it allows a 3D-network structure skeleton to be formed with higher reliability. The explanation hereinbelow will be conducted with reference to the manufacture with the sol-gel method, as a representative example.

No limitation is placed on the starting materials, provided that a wet gel can be formed by a sol-gel reaction. Starting materials that have been used by the conventional sol-gel method can be used. For example, inorganic materials such as sodium silicate and aluminum hydroxide, and organic materials of organometallic alkoxides such as tetramethoxysilane, tetraethoxysilane, aluminum isopropoxide, and aluminum-sec-butoxide can be used. Those materials are selected according to the type of the target inorganic oxide.

The sol-gel method can be performed under the well-known conditions. Typically a solution may be prepared by dissolving the aforementioned starting materials in a solvent, conducting a reaction at room temperature or under heating, and gelling. For example, when a wet gel of silica ($SiO_2$) is produced, the method may be implemented as follows.

Examples of starting materials for silica include alkoxysilane compounds such as tetramethoxysilane, tetraethoxysilane, trimethoxymethylsilane, dimethoxydimethylsilane, oligomers thereof, water glass compounds such as sodium silicate (soda silicate) and potassium silicate, and colloidal silica. They can be used singly or in mixture thereof.

No specific limitation is placed on the solvent, provided that starting materials can be dissolved therein and the silica produced is not dissolved therein. In addition to water, examples of suitable solvents include methanol, ethanol, propanol, acetone, toluene, and hexane. Those solvents can be used singly or in combination of two or more thereof.

If necessary, a variety of additives such as catalysts and viscosity-adjusting agents can be added. Water, acids such as hydrochloric acid, sulfuric acid, and acetic acid, and bases such as ammonia, pyridine, sodium hydroxide, and potassium hydroxide can be used as a catalyst. Ethylene glycol, glycerin, polyvinyl alcohol, and silicone oil can be used as the viscosity-adjusting agents. No limitation is placed thereon, provided that the wet gel can be obtained in a prescribed usage form.

A solution is prepared by dissolving the starting material in the solvent. In this case, the concentration of the solution differs depending on the type of starting materials or solvent used and the desired state of the gel. Typically the concentration of solid components forming the skeleton may be about 2 to 30 wt. %. With using the solution, a desired usage shape may be formed by injection molding, coating, or the like after optional addition of the aforementioned additives and stirring. If the fixed time elapses in this state, the solution is gelled and the prescribed wet gel can be obtained. More specifically, starting materials react in the solvent and form fine particles and a wet gel is produced by the fine particles that congregate and form a 3D-network structure skeleton.

In this case no limitation is placed on the solution temperature, and the process may be conducted at normal temperature or under heating. In case of heating, the temperature can be appropriately set within a temperature range below the boiling point of the solvent used. For certain combinations of starting materials, cooling may be conducted during gelling.

The wet gel produced may be subjected, if necessary, to surface treatment with the object of increasing affinity to a solvent in subsequent processing such as carbon precursor formation. In this case, the treatment can be conducted by inducing chemical reaction of a surface treatment agent with the surface of solid components in a solvent after the wet gel has been produced.

Examples of surface treatment agents include halogenated silane treatment agents such as trimethylchlorosilane, dimethyldichlorosilane, methyltrichlorosilane, ethyltrichlorosilane, and phenyltrichlorosilane; alkoxysilane treatment agents such as trimethylmethoxysilane, trimethylethoxysilane, dimethyldimethoxysilane, methyltriethoxysilane, and phenyltriethoxysilane; silicone silane treatment agents such as hexamethyldisiloxane and dimethylsiloxane oligomer, aminesilane treatment agents such as hexamethyldisilazane, and alcohol-based treatment agents such as propyl alcohol, butyl alcohol, hexyl alcohol, octanol, and decanol. Those agents may be selected individually or in combination of two or more thereof according to the application of the electron-emitting material (porous body).

As described above, carbon or materials containing carbon as the main component can be used as the carbon material provided to the gel. Examples of suitable materials include carbon black (acetylene black, Ketjen black, and the like), active carbon, artificial graphite, natural graphite, carbon fibers, pyrolyzed carbon, glassy carbon, impermeable carbon, special carbon, and coke. No limitation is placed on the crystal structure, and diamond structure and graphite structure may be used. Furthermore, nanocarbon materials such as carbon nanotubes, carbon nanohorns, carbon nanoribbons, carbon nanocoils, and carbon nanocapsules can be used. Those materials can be used singly or in combination or two or more thereof. The materials can be appropriately selected according to the application of the porous body.

No limitation is placed on the method for providing the carbon material. A vapor phase method, liquid phase method, or solid phase method can be employed. For example, (a) a method for depositing a carbon material on the skeleton surface of the gel (preferably, dry gel) by a vapor phase process, and (b) a method for providing a dispersion of a carbon material (for example, carbon-containing ultrafine particles having an average particle size of 10 nm or less) to a gel (preferably, wet gel) can be employed.

A process for providing a carbon material by a vapor phase method will be described as the method (a).

In this method, energy is imparted to a starting material that can produce a carbon material, and the carbon material thus produced is deposited on the gel skeleton surface. According to this method, a carbon material can be formed on the gel. Therefore, this method is effective because it does not require a carbonization treatment to be conducted in the implementation thereof.

Examples of the aforementioned starting materials include saturated hydrocarbon compounds such as methane, ethane, propane, and butane, unsaturated hydrocarbon compounds such as ethylene, acetylene, and propylene, aromatic hydrocarbon compounds such as benzene and xylene, alcohols such as methanol and ethanol, nitrogen-containing hydrocarbons such as acrylonitrile, and carbon-containing gases such as gaseous mixture of carbon monoxide and hydrogen and gaseous mixtures of carbon dioxide and hydrogen. Those starting materials can be used singly or in combination of two or more thereof.

Heat, plasma, ions, light, and catalysts can be employed as an energy for converting those starting materials into carbon. A method comprising heating is preferred for advancing carbonization in the dry gel because this method has high controllability.

The vapor phase method may be implemented under usual conditions. For example, a method may be used by which a gel is placed in a reaction vessels, the aforementioned starting materials are evaporated in the reactive atmosphere, and carbon is deposited on the gel skeleton surface under heating. The conditions of this process can be appropriately adjusted according to the application and desired properties of the porous body.

With the aforementioned method (b), a wet gel is preferably used, and a carbon-containing material can be obtained by dispersing carbon in the solvent contained in the gel and then conducting drying. In this case, the carbon material which is to be dispersed is preferably in the form of ultrafine particles having a mean particle size of 1 nm to 10 nm.

No specific limitation is placed on the amount (coated amount) of carbon material used when the carbon material is coated on the gel. This amount can be appropriately set according to the application of the electron-emitting material, method of use, and type of the carbon material used.

The carbon-containing material obtained in the process A may be used as is as the electron-emitting material. Furthermore, a solvent removal process (drying process) may be also implemented, if necessary, with the object of removing the remaining solvent present in the gel. In particular, when wet gel is used as the gel, it is preferred that the solvent removal process be implemented. This process may be carried out in the same manner as the below-described drying treatment.

[Process B]

Process B is a process for obtaining a carbon-containing material by applying a carbon precursor to the gel and carbonizing the obtained carbon precursor containing gel.

A gel described with reference to process A can be used as the aforementioned gel. Therefore, either a wet gel or a dry gel may be used as the gel.

No specific limitation is placed on the carbon precursor, provided it eventually becomes carbon upon carbonization. Therefore, all the materials containing carbon can be used. Generally organic materials are preferable.

Among them, in accordance with the present invention, organic polymers can be used advantageously. Examples of such compounds include polymers or copolymers such as polyacrylonitrile, polyfurfuryl alcohol, polyimides, polyamides, polyurethanes, polyurea, polyphenols (phenolic resins), polyaniline, polyparaphenylene, polyetherimides, polyamidoimides, and acryl copolymers.

Among them, organic polymers having one or more carbon-carbon unsaturated bonds are preferred. Thus, organic polymers having at least one carbon-carbon double bond and carbon-carbon triple bond are preferred. Using such organic polymers makes it possible to conduct carbonization easily and reliably. Moreover, a carbon material with the prescribed strength can be formed. Examples of such organic polymers include phenolic resins, epoxy resins, polyimides, polystyrene, polysulfone, polyphenyl ether, melamine resins, and aromatic polyamides. Those polymers can be used singly or in combination of two or more thereof. Furthermore, they can be used together with other organic polymers. In accordance with the present invention, organic polymers having one or more aromatic rings are especially preferred. For example, at least one of phenolic resins and polyimides can be used advantageously.

Furthermore, those organic polymers that do not have an aromatic ring (for example, polyacrylonitrile, acryl copolymers, and the like), but in which rings are formed in the course of carbonization and unsaturated bonds are produced can be also used advantageously. In other words, those organic polymers which do not have carbon-carbon unsaturated bonds before carbonization, but in which rings can be induced and carbon-carbon unsaturated bonds can be produced by carbonization can be also used advantageously. Among such organic polymers, polyacrylonitrile is especially preferred.

No specific limitation is placed on the method for the preparation of a carbon precursor containing gel by adding a carbon precursor to the gel, provided that the carbon precursor is formed on the 3D-network structure skeleton of an inorganic oxide serving as a carbon precursor. Examples of methods that can be advantageously used include, (a) a method comprising impregnating a wet gel of an inorganic oxide with a carbon precursor, (b) a method comprising using a monomer capable of forming an organic polymer or an oligomer, and impregnating a wet gel therewith, then conducting polymerization and producing an organic polymer which is the carbon precursor, and (c) a method comprising the steps of providing, by a vapor phase method, a monomer capable of forming an organic polymer inside a dry gel of an inorganic oxide, then conducting polymerization and producing an organic polymer as the carbon precursor.

Specific implementation of the above-described method (a) can involve impregnating a wet gel with a solution obtained by dissolving a carbon precursor in a solvent or a dispersion (emulsion and the like) obtained by dispersing a carbon precursor in a solvent. As a result, the carbon precursor adheres to the 3D-network structure skeleton and forms a coating thereof. When an organic polymer is used as the carbon precursor and the solution or dispersion thereof is brought into contact with a wet gel, the wet gel retains the solution or dispersion inside thereof and the organic polymer remains in the 3D-network skeleton structure after completion of drying. In this case, the polymer may be physically adsorbed by the 3D-network skeleton structure. Furthermore, if the wet gel containing a solution with an organic polymer dissolved therein is immersed in a poor solvent with respect to the organic polymer, then the organic polymer will precipitate on the 3D-network skeleton structure and will form the surface portion.

The solvent used in the aforementioned solution or dispersion may be appropriately selected from the well-known solvents according to the type of the organic polymer. Examples of suitable solvents include water, alcohols such as methanol, ethanol, propanol, and butanol, and glycols such as ethylene glycol and propylene glycol. Those solvents can be used singly or in combination or two or more thereof.

No limitation is placed on the concentration of the carbon precursor in the solution or dispersion, and the specific concentration can be appropriately selected according to the desired amount of the carbon precursor which is to be provided and the type of the carbon precursor.

Specific implementation of the above-mentioned method (b) can involve impregnating a wet gel with a solution obtained by dissolving an organic compound (also including oligomer), which is capable of forming an organic polymer by polymerization, in a solvent or with a dispersion obtained by dispersing the organic compound in a solvent, conducting polymerization inside the gel, and producing an organic polymer which is a carbon precursor. With this method, an organic polymer grows inside the 3D-network structure skeleton. Therefore, a carbon precursor containing wet gel which has high resistance to physical dissolution can be obtained.

A monomer corresponding to the target organic polymer may be used as the aforementioned organic compound. For example, when polyacrylonitrile is to be obtained, acrylonitrile can be used, when polyfurfuryl alcohol is to be obtained, furfuryl alcohol can be used, and when polyaniline is to be obtained, aniline can be used. Furthermore, when polyimides are produced by a polycondensation reaction which forms imide rings, anhydrous tetracarboxylic acid compounds and diamine compounds can be used as typical compounds. When polyamides are obtained by a polycondensation reaction which forms amido bonds, dicarboxylic acid compounds or dicarboxylic acid chloride compounds, and diamine compounds can be used as typical compounds. When polyurethanes are produced, diol compounds such as polyols and diisocyanate compounds may be used. When polyurea is obtained, diisocyanate compounds may be used. And when polyphenols are obtained, phenol compounds and aldehyde compounds may be used.

The organic polymer in accordance with the present invention preferably has one or more carbon-carbon unsaturated bonds. Therefore, organic compounds that produce such organic polymers can be advantageously used. For example, when the organic polymer is a phenolic resin, examples of suitable phenolic compounds include phenol, cresol, resorcinol (1,3-benzene diol), catechol, fluoroglycinol, salicylic acid, and hydroxybenzoic acid. In this case, formaldehyde, acetaldehyde, furfural, paraformaldehyde producing formaldehyde upon heating, and hexamethylene tetramine can be used as aldehyde compounds serving as condensating agents. Basic catalysts and/or acidic catalysts can be used as condensation catalysts. Basic catalysts mainly may catalyze the addition reaction of methylol groups and the like, and acidic catalysts mainly may catalyze the polyaddition condensation reaction of methylene bonds and the like. For example, typical catalysts for the manufacture of phenolic resins, such as hydroxides of alkali metals such as sodium hydroxide and potassium hydroxide, carbonates of alkali metals such as sodium carbonate and potassium carbonate, amines, and ammonia can be used as a basic catalyst. Examples of acid catalysts that can be used include sulfuric acid, hydrochloric acid, phosphoric acid, oxalic acid, acetic acid, and trifluoroacetic acid.

No specific limitation is placed on a solvent for dissolving or dispersing the organic compound, and this solvent may be appropriately selected from the well-known solvents according to the type of the organic compound that will be used. Examples of suitable solvents include water, alcohols such as methanol, ethanol, propanol, and butanol, and glycols such as ethylene glycol and propylene glycol. These solvents may be used singly or in combination of two or more thereof.

No specific limitation is placed on the concentration of the organic solvent in the solution or dispersion, and this concentration may be appropriately determined according to the type of the organic compound that will be used.

No specific limitation is placed on the polymerization method, and the polymerization can be performed by known methods such as thermal polymerization, catalytic polymerization, photopolymerization, and the like.

With the above-mentioned method (c), a monomer that can form an organic polymer as the carbon precursor is provided in a dry gel of an inorganic oxide by a vapor phase method, followed by polymerization. More specifically, this method comprises the steps of preparing a vapor of a monomer of an organic polymer such as the above-mentioned polyacrylonitrile, polyfurfuryl alcohol, and polyaniline, filling the gel with the vapor, and conducting polymerization. Furthermore, in case of producing polyphenols, the gel can be filled with a phenol compound and then with vapor of formaldehyde as a condensing agent, followed by condensation polymerization. Furthermore, in case of obtaining polyimides and polyamides, a carboxylic acid compound and a diamine compound serving as starting materials can be evaporated and a gel can be filled with the vapors, followed by polycondensation.

No specific limitation is placed on the vapor phase method. For example, typical methods such as chemical vapor deposition (CVD) and physical vapor deposition (PVD) can be employed. A polymer or a monomer therefor can be gasified or evaporated by heating with using these methods.

The polymerization method can be carried out in the same manner as described with reference to method (b).

In subsequent carbonization treatment, the carbon precursor containing gel that was thus obtained is subjected to carbonization by conducting heat treatment.

In this case, when a wet gel is used as the gel, the gel is preferably dried prior to carbonization to obtain a dry gel.

Usual drying methods such as natural drying, drying by heating, and vacuum drying, as well as supercritical drying method and freeze drying method can be used for the aforementioned drying. Typically if the amount of solid components in a wet gel is decreased to increase the surface area of the dry gel and decrease its density, the gel strength decreases. Furthermore, when drying alone is conducted, the gel most often shrinks under the effect of stresses generated during solvent evaporation. In order to obtain a dry gel demonstrating excellent porous capability from a wet gel, it is preferred that supercritical drying or freeze drying be used. As a result, shrinkage, that is, densification of the gel during drying can be effectively avoided. Even when usual drying means is used for solvent evaporation, shrinkage of the gel during drying can be suppressed by using a solvent with a high boiling point for reducing the evaporation rate or controlling the evaporation temperature. Furthermore, shrinkage of the gel during drying can be also controlled by subjecting the surface of the solid components of the gel to water repelling treatment, thereby controlling surface tension.

With the supercritical drying method or freeze drying method, the gas-liquid interface is eliminated and drying can be conducted without applying stresses induced by surface tension to the gel skeleton by changing the phase state of the solvent from the liquid state. Therefore, shrinkage of the gel during drying can be prevented and a porous body of a dry gel having a low density can be obtained. In accordance with the present invention, it is especially preferred that the supercritical drying method be used.

A solvent which is held by the wet gel can be used as a solvent employed in supercritical drying. Furthermore, it is preferred that, if necessary, this solvent be replaced with a solvent which is easy to handle in supercritical drying. Examples of replacement solvents include alcohols such as methanol, ethanol, and isopropyl alcohol which directly convert the solvent into a supercritical fluid, and also carbon dioxide and water. Furthermore, organic solvents such as acetone, isoamyl acetate, and hexane, which are easily dissolved by supercritical fluids thereof may be also used for substitution.

Supercritical drying can be conducted in a pressure vessel such as an autoclave. For example, when the solvent is methanol, drying is conducted by raising the pressure and temperature to a critical pressure of 8.09 MPa or higher and a critical temperature of 239.4° C. or higher, which are the critical conditions for methanol, and then gradually releasing the pressure while maintaining a constant temperature. For example, when the solvent is carbon dioxide, drying is conducted by raising the pressure and temperature to a critical pressure of 7.38 MPa or higher and a critical temperature of 31.1° C. or higher, and then gradually releasing the pressure from the supercritical state, while maintaining a constant temperature, and obtaining a gaseous state. For example, when the solvent is water, drying is conducted by raising the pressure and temperature to a critical pressure of 22.04 MPa or higher and critical temperature of 374.2° C. or higher. As for the time necessary for drying, it may be equal to or longer than that required for the solvent inside the wet gel to be replaced at least one time with the supercritical fluid.

Carbonization is preferably conducted at a temperature of 300° C. or higher because carbonization is initiated when the carbon precursor has a temperature of about 300° C. or higher. From the standpoint of operation time efficiency, it is preferred than the temperature be 400° C. or higher. The upper limit of heating temperature can be set appropriately to a temperature less than the melting point of the inorganic oxide of the 3D-network structure skeleton. For example, when silica is used as the inorganic oxide, the dry gel somewhat shrinks at a temperature of about 600° C., but the shrinkage becomes significant at a temperature of 1000° C. or higher. Therefore, the carbonization temperature may be selected at a level allowing for effective suppression of shrinkage. In accordance with the present invention, it is especially preferred that carbonization be conducted at a temperature less than 1000° C. (even better, at a temperature of 800° C. or less)

No specific limitation is placed on the carbonization atmosphere, and carbonization may be conducted in the air, in an oxidizing atmosphere, in a reducing atmosphere, in an inert gas atmosphere, or in vacuum. However, from the standpoint of possible combustion, it is preferred that the carbonization be conducted in an atmosphere with a low oxygen concentration when a high temperature is set. The atmosphere with a low oxygen concentration in accordance with the present invention means that the oxygen concentration in the atmosphere is 0 to 10%. Carbonization can be also conducted by a drying method, heating in an inactive gas atmosphere such as nitrogen or argon, or heating in vacuum Second Method The second method is a first method further comprising a process for removing partially or completely the inorganic oxide from the carbon-containing material or material containing a carbon precursor.

Of the porous bodies, the second method makes it possible to obtain advantageously a porous body whose inner portion is occupied by an inorganic oxide or empty space or a porous body whose inner portion is occupied by an empty space. Thus, a porous body whose inner portion is occupied by an inorganic oxide or empty space can be obtained by partially removing the inorganic oxide. If the entire inorganic oxide is removed, a porous body can be obtained in which the substantially entire inner portion is occupied by an empty space.

A process for removing the inorganic oxide will be described below. With the second method, the inorganic oxide is removed partially or completely from the carbon-containing material or a carbon precursor containing material. Those removal processes may be implemented at any stage of the first method. Thus, the present invention includes a method by which the inorganic oxide is removed partially or completely from the carbon-containing material obtained in process A, a method by which the inorganic oxide is removed partially or completely from the carbon precursor containing material which is produced in process B and the material obtained is then carbonized, and a method by which the inorganic oxide is removed partially or completely from the carbon-containing material obtained by carbonization in process B.

No limitation is placed on the method for removing the inorganic oxide. For example, any of the well-known methods including evaporation, sublimation, and dissolution can be used. In particular, in accordance with the present invention, it is preferred that this process be implemented under mild temperature conditions at which little effect is produced on the gel skeleton. Therefore, removal by dissolution is preferred.

Immersion in a solution that will dissolve the inorganic oxide may be employed as the dissolution method. Solutions of acids or bases can be advantageously used for the solution employed in the process. In most cases the gel of an inorganic oxide formed by the sol-gel method has low crystallinity and is amorphous. For this reason, it has high solubility in strong acids and bases. Furthermore, a gel with a 3D-network structure skeleton which is a fine particle aggregate also has a high softening ability (peptizing ability).

Acids and bases can be appropriately selected according to the type of the inorganic oxide. For example, when the inorganic oxide is silica, hydrofluoric acid, alkali hydroxides (sodium hydroxide, potassium hydroxide), and alkali carbonates (sodium carbonate, sodium hydrogen carbonate) can be advantageously used. Those compounds can be used in the form of an aqueous solution, alcohol solution, and the like. The concentration of acids or bases may be appropriately selected according to the type of the acid or base used, the type of inorganic oxide, and the like.

With the second method for removing the inorganic oxide, a porous body can be obtained which has a specific surface area larger than that of the carbon-containing porous body obtained by the first method. In the 3D-network structure skeleton composed of such a carbon material, a hollow structure is mostly visible in observations with an electron microscope or the like. Even when a clear hollow structure is not observed under an electron microscope, a carbon porous body with a large specific surface area is still obtained.

The preferred embodiment of the method for the manufacture of an electron-emitting material in accordance with the present invention will be described hereinbelow with reference to the drawings.

<Embodiment 4>

Figure 4:
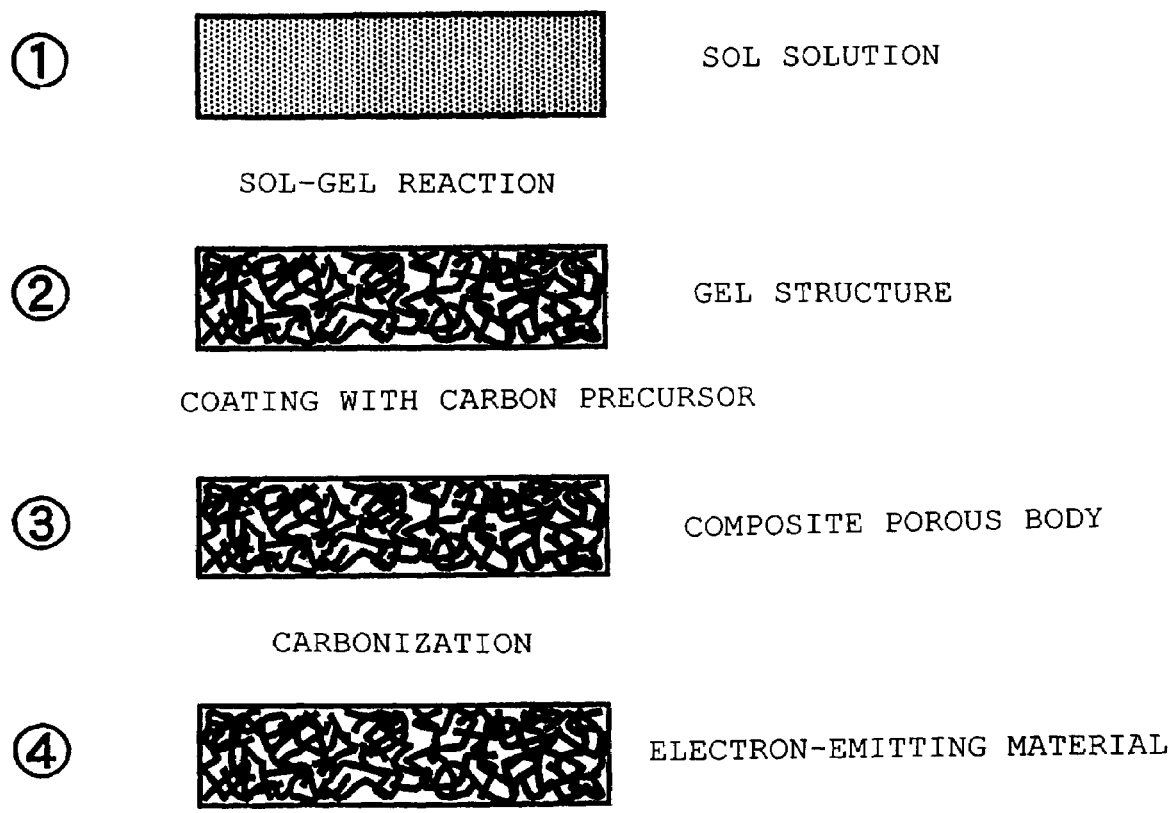
FIG. 4 a schematic drawing illustrating an example of the manufacturing process in accordance with the present invention.

The first method for the manufacture of an electron-emitting material composed of a carbon-containing porous body is composed of basic steps shown in FIG. 4. Those basic steps include forming a 3D-network skeleton structure (gel structure: FIG. 4-②) from a prepared sol solution (FIG. 4-①) by using a sol-gel method, then forming a carbon precursor on the skeleton surface of the wet gel and obtaining a porous body comprising a carbon precursor (composite porous body) (FIG. 4-③), and carbonizing the carbon precursor coated on the skeleton surface to convert it into carbon (FIG. 4-④).

Thus, the method comprises the following steps: synthesizing a wet gel of an inorganic oxide from starting materials of the inorganic oxide, obtaining a carbon precursor containing wet gel by forming the carbon precursor in a liquid phase in the wet gel of the inorganic oxide thus obtained, then obtaining a composite dry gel by drying the carbon precursor containing wet gel, and then obtaining a carbon-containing porous body by carbonization. Those steps are basic steps of the process. Treatment processes such as solvent substitution, catalytic formation, and surface treatment may be appropriately carried out for implementing those steps.

According to this manufacturing method, the 3D-network skeleton structure composed of an inorganic oxide serves as a support for suppressing shrinkage during carbonization when the carbon precursor is carbonized. Therefore, shrinkage of the carbon precursor in the course of carbonization can be suppressed or prevented. As a result, the increase in density during formation of a carbon coating by the carbon precursor can be suppressed and the decrease in specific surface area can be suppressed.

<Embodiment 5>

Figure 5:
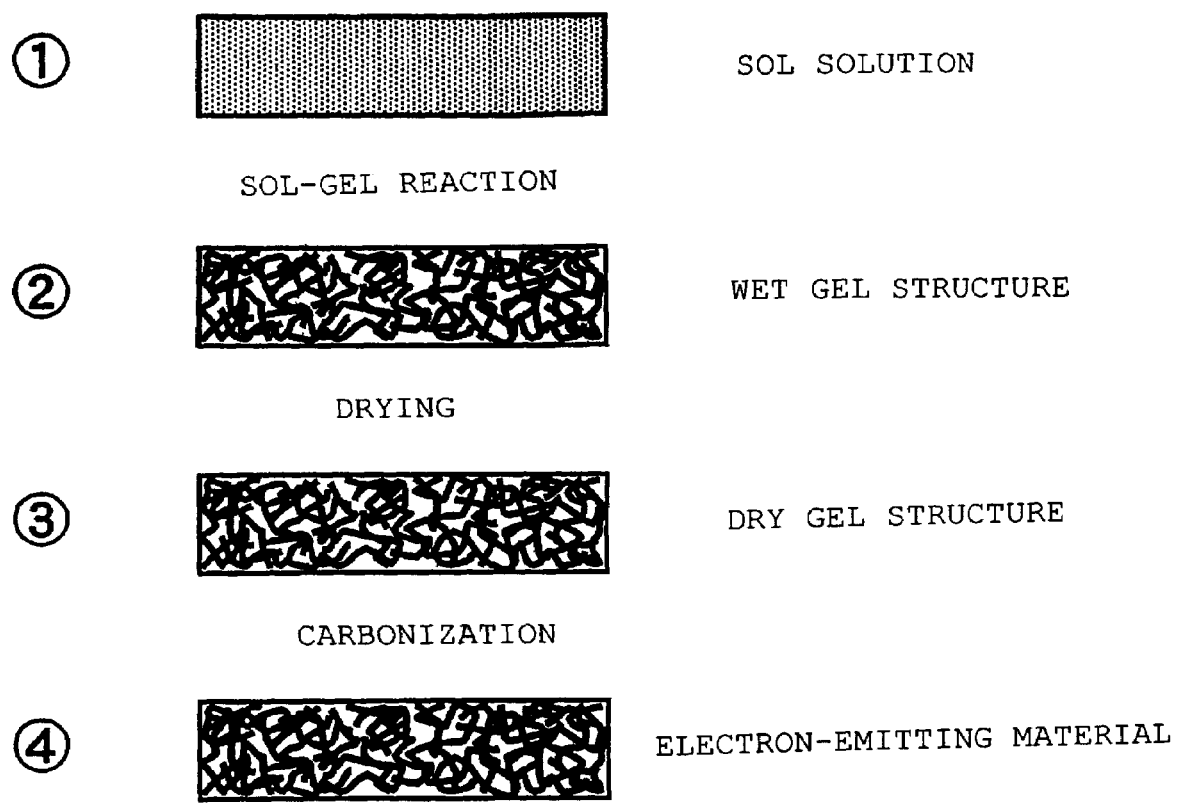
FIG. 5 a schematic drawing illustrating an example of the manufacturing process in accordance with the present invention.

The second method for the manufacture of an electron-emitting material composed of a carbon-containing porous body is composed of basic steps shown in FIG. 5. According to this method, a dry gel of an inorganic oxide having a 3D-network skeleton is provided with a carbon material by a vapor phase method.

Thus, a carbon-containing porous body is obtained by a method comprising the steps of preparing a wet gel of an inorganic oxide (FIG. 5-②) from a starting material of an inorganic oxide (FIG. 5-①), obtaining a dry gel of the inorganic oxide (FIG. 5-③) by drying the wet gel thus obtained, and forming a carbon-containing material by a vapor phase reaction on the skeleton surface of the dry gel (FIG. 5-④). Those steps are basic steps of the process. Well-known treatment processes such as solvent substitution, catalytic formation, and surface treatment may be appropriately carried out for implementing those steps.

In addition to a method of providing a carbon precursor by a vapor phase reaction and then conducting carbonization, a method of directly forming a carbon material by a vapor phase reaction can be used as a method for forming a carbon-containing material in a vapor phase. In accordance with the present invention, any of those methods may be used.

According to this manufacturing method, the 3D-network skeleton structure composed of an inorganic oxide serves as a support for holding the aforementioned structure when a carbon-containing coating is formed. As a result, shrinkage during carbon coating formation can be suppressed. Therefore, the increase in density of the carbon composite that will be obtained is suppressed and the decrease in specific surface area can be suppressed. In particular, this method is advantageous because when a carbon material is directly provided in a vapor phase, strains such as shrinkage caused by carbonization of carbon precursor can be avoided.

<Embodiment 6>

Figure 6:
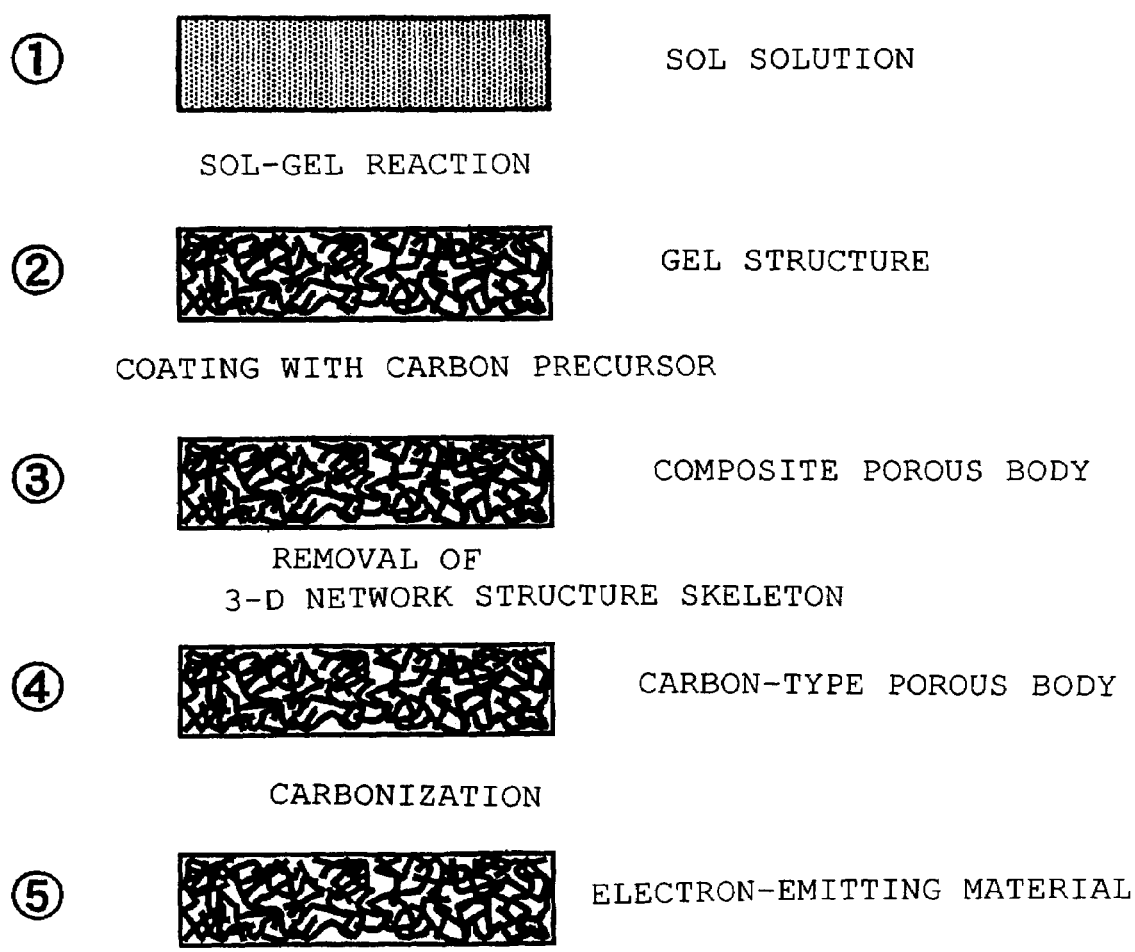
FIG. 6 a schematic drawing illustrating an example of the manufacturing process in accordance with the present invention.

The first method for the manufacture of an electron-emitting material composed of a hollow carbon porous body is composed of basic steps shown in FIG. 6. Those steps include forming a 3D-network skeleton structure (FIG. 6-②) of an inorganic oxide from a sol solution (FIG. 6-①), then providing the skeleton surface of the wet gel with a carbon precursor and manufacturing a carbon-containing porous body (FIG. 6-③), preparing a dry gel of the carbon precursor by removing partially or completely the inorganic oxide from the carbon-type porous body (FIG. 6-④), and then carbonizing the carbon precursor of the hollow structure to convert it into carbon (FIG. 6-⑤).

Thus, the method comprises the following steps: synthesizing a wet gel of an inorganic oxide from starting materials of the inorganic oxide, obtaining a carbon precursor containing wet gel by forming the carbon precursor in a liquid phase in the wet gel of the inorganic oxide thus obtained, then removing the inorganic oxide from the carbon precursor containing wet gel, obtaining a dry gel by drying the carbon precursor containing wet gel, and then obtaining a carbon porous body by carbonization. Those steps are basic steps of the process. Well-known treatment processes such as solvent substitution, catalytic formation, and surface treatment may be appropriately carried out for implementing those steps.

With this method, a 3D-network skeleton is formed from the carbon-containing material itself, this material being an electron-emitting component. Therefore, a carbon porous body with a large specific surface area can be obtained. Furthermore, because the inner portion of the 3D-network skeleton is hollow, further increase in specific surface area can be achieved. As a result, a carbon porous body with a low density and a high specific surface area can be obtained. This material can be used for applications that require a high electron emission capability.

<Embodiment 7>

Figure 7:
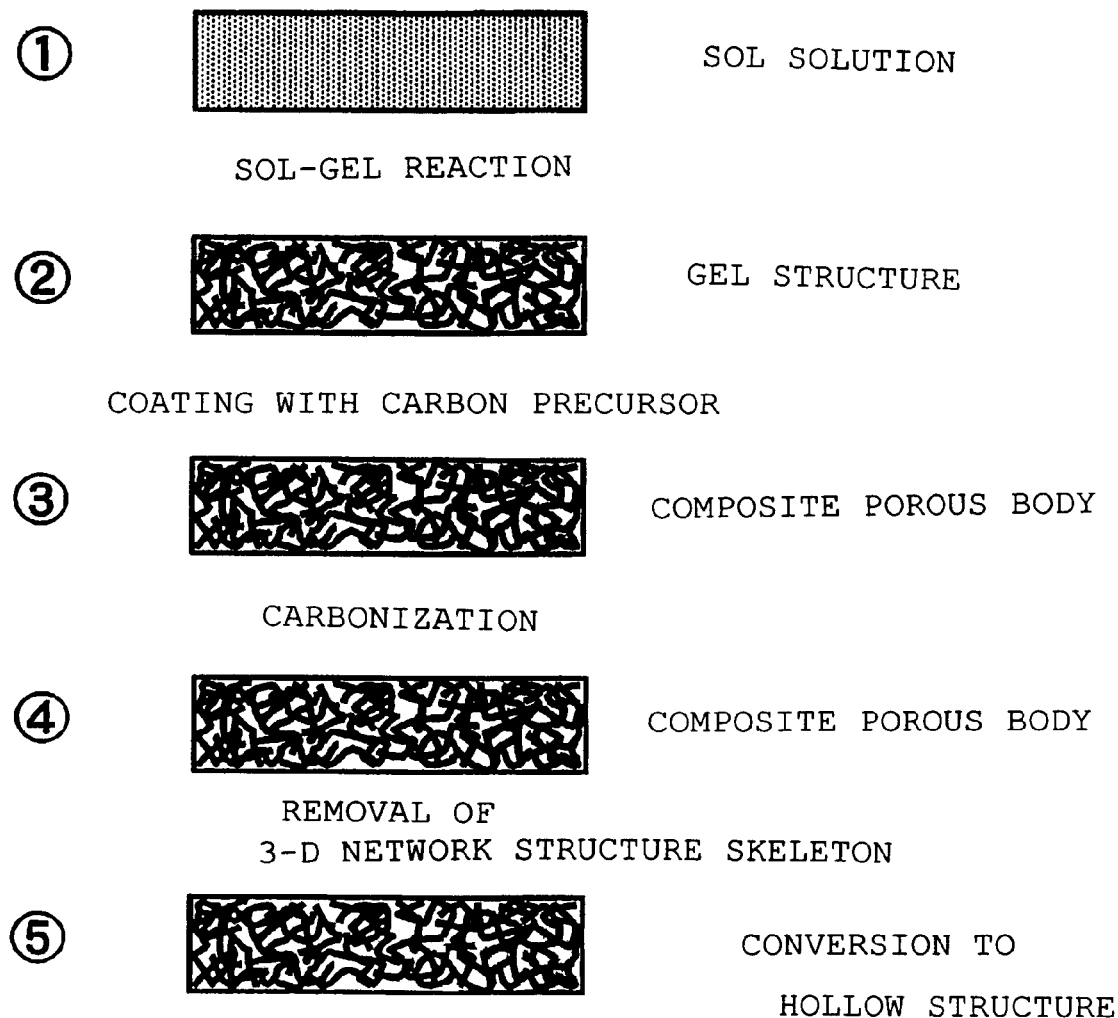
FIG. 7 a schematic drawing illustrating an example of the manufacturing process in accordance with the present invention.

The second method for the manufacture of an electron-emitting material consisting of a carbon porous body is composed of basic steps shown in FIG. 7. With this method a carbon porous body (FIG. 7-⑤) is obtained by partially or completely removing the inorganic oxide from the carbon-containing porous body (FIG. 7-①~④) obtained in the third embodiment or fourth embodiment.

With this method, a 3D-network skeleton is formed from the carbon-containing material itself, this material being an electron-emitting component. Therefore, a carbon porous body with a large specific surface area can be obtained. Furthermore, because the inner portion of the 3D-network skeleton is hollow, a higher specific surface area can be realized. As a result, a carbon porous body with a low density and a high specific surface area can be provided. This material can be used for applications that require a high electron emission capability.

(2) Electron-Emitting Element

The electron-emitting element in accordance with the present invention comprises: (a) a substrate, (b) a lower electrode layer provided on the substrate, (c) an electron-emitting layer provided on the lower electrode layer, and (d) a control electrode layer so disposed as not to be in contact with the electron-emitting layer.

The electron-emitting element in accordance with the present invention has the above-described structural elements (a) to (d) and can employ elements (a spacer and the like) that have been used in the well-known electron-emitting elements, in addition to the electron-emitting material described in section (1) above as an electron-emitting layer.

The substrate can be selected from well-known materials. For example, electrically insulating materials such as glass, quartz, and ceramics (oxide ceramics such as $Al_2O_3$ and $ZrO_2$, and non-oxide ceramics such as $Si_3N_4$, and BN), and electrically conductive materials such as low-resistance silicon, metals, alloys, and intermetallic compounds can be also used. No specific limitation is placed on the thickness of the substrate, and typically it may be about 0.5 to 2 mm.

No specific limitation is placed on the lower electrode layer, provided it is a material capable of supplying electrons into the electron-emitting layer. For example, metal materials such as aluminum, titanium, chromium, nickel, copper, gold, and tungsten, and composite materials obtained by laminating a metal and a low-resistance n-type semiconductor such as silicon, gallium nitride can be used. The thickness of the lower electrode layer typically may be about 1 to 50 µm.

The material in accordance with the present invention is used for the entire electron-emitting layer or part thereof. This material may be a material that emits electrons at least in an electric field. In other words, the material in accordance with the present invention may also emit electrons under the effect of heat, provided that it emits electrons in an electric field. The electron-emitting material of one type or two or more types can be used. Furthermore, electron-emitting materials (for example, silicon, metal materials, and the like) other than the material in accordance with the present invention may be contained therein.

Moreover, components other than the electron-emitting material may be contained in amounts within a range in which the effect of the present invention is not degraded. It is preferred that the material in accordance with the present invention be contained at 20 vol. % or more (in particular, 50 to 100 vol. %) in the electron-emitting layer. The thickness of the electron-emitting layer differs depending on type of the electron-emitting material used, but typically may be about 0.5 to 20 µm.

The material in accordance with the present invention is exposed on the surface of the electron-emitting layer. When the entire electron-emitting layer consists of the material in accordance with the present invention (electron-emitting material), that is, when the electron-emitting layer is composed of the material in accordance with the present invention (electron-emitting material), the material in accordance with the present invention (electron-emitting material) is obviously exposed on the surface of the electron-emitting layer. On the other hand, when part of the electron-emitting layer comprises the material in accordance with the present invention (electron-emitting material), the entire material in accordance with the present invention (electron-emitting material) or part thereof is exposed on the surface of the electron-emitting layer. Furthermore, the electron-emitting layer has electric conductivity, as illustrated by an example in which it is composed of carbon.

The electron-emitting layer may be obtained by baking a film of a paste containing a powdered electron-emitting material. For example, the prescribed electron-emitting layer can be advantageously obtained by mixing an organic binder (isopropyl methacrylate, or the like) with a powdered electron-emitting material having a mean particle diameter of about 0.5 to 10 μm, applying the paste obtained to the lower electrode layer, and removing the organic binder by baking the film obtained. This electron-emitting layer also can demonstrate the desired electron-emitting capability.

The control electrode layer has a function of providing an electric field to the electron-emitting layer by voltage application and controlling the amount of emitted electrons by the intensity of this electric field. No limitation is placed on the material therefor, provided it can demonstrate such a function. In particular, metals with good adhesion to the adjacent layers and having good processability such as pattern formation ability can be advantageously used. Typically aluminum, nickel or the like can be advantageously used. The thickness of the control electrode layer usually may be about 0.1 to 3 μm.

In the element in accordance with the present invention, any arrangement may be employed for the electron-emitting layer and the control electrode layer, provided that they are not in contact with each other. At least one of an empty space and an electric insulator may be introduced between the electron-emitting layer and control electrode layer. For example, the electron-emitting layer provided on the substrate may be arranged opposite the control electrode layer via an empty space. More specifically, they can be arranged similarly to a gate electrode and an emitter in the conventional Spindt-type electron-emitting elements. The above-mentioned empty space is preferably in a vacuum state or a state close thereto. The distance between the two layers can be appropriately determined according to the desired performance, intensity of electric field and the like. Typically, the smaller is this distance, the lower voltage is required. Furthermore, it is preferred that the electron-emitting layer and control electrode layer be arranged substantially parallel to each other.

Figure 11:
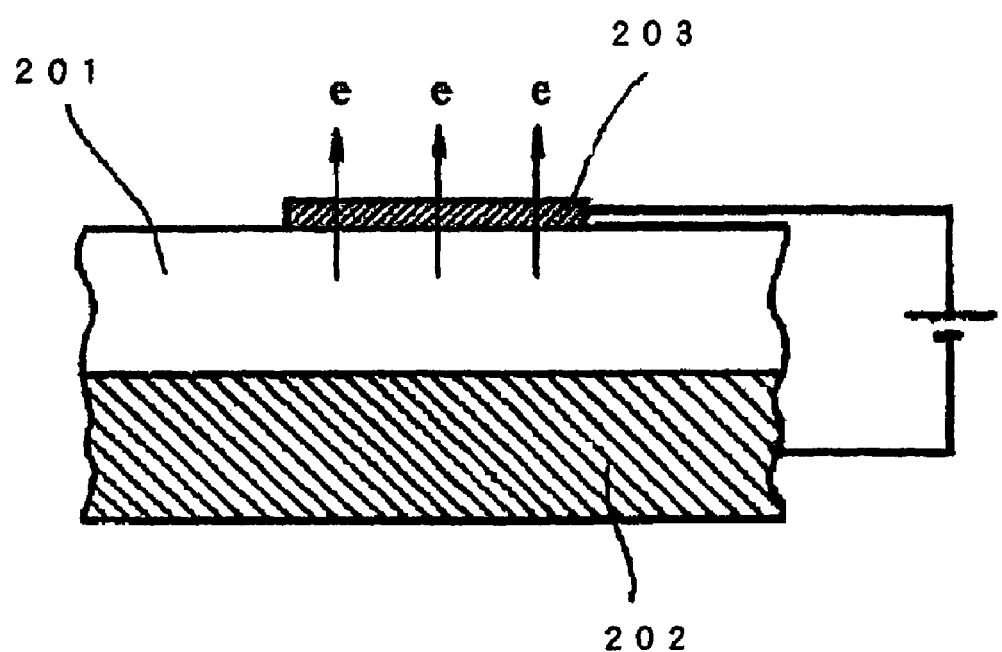
FIG. 11 illustrates schematically a conventional element emitting electrons in electric field.

The expression "the electron-emitting layer and control electrode layer are not in contact with each other" means that there is a distance between the electron-emitting layer and control electrode layer and electric insulation is provided therebetween, as shown, for example, in the below-described FIG. 8 and FIG. 9. In Japanese Unexamined Patent Publication No. 2000-285797, which represents an example of prior art technology, the electron accelerating layer 101 composed of a porous silica film and a lead-out electrode 103 are in contact, as shown in FIG. 11. In this prior art, if the material of the electron accelerating layer 101 is replaced with an electrically conductive material such as carbon, then the emitter electrode 102, electron accelerating layer 101 and lead-out electrode 103 will be short circuited and the functions of the electron-emitting element will be completely lost. In other words, for the electron-emitting element disclosed in this prior art to function as an electron-emitting element, the substance (porous silica film) constituting the electron accelerating layer 101 has to be an electrically insulating substance. Therefore, in the prior art, the porous silica film constituting the electron accelerating layer 101 cannot be replaced with an electrically conductive material such as carbon. Furthermore, it should be taken into consideration that in the prior art example (FIG. 11), the electron accelerating layer 101 composed of a porous silica film appears to be the component emitting electrons, but this prior art discloses "the emitter electrode emitting electrons in an electric field" and, therefore, it is the emitter electrode 102 which is the component emitting electrons, not the electron accelerating layer 101 composed of the porous silica film.

The electron-emitting layer and control electrode layer can be disposed independently from each other. Further, they may be also fixed via a spacer (insulator). Electrically insulating materials such as alumina, zirconia, and silicon dioxide can be advantageously used as the spacer.

The method for the manufacture of the element in accordance with the present invention may employ the well-known film fabrication technology and semiconductor fabrication technology. For example, a sputtering method, vacuum deposition method, electron beam deposition method, and chemical vapor deposition method (CVD) can be advantageously used as the film fabrication technology.

No specific limitation is placed on the method for forming the electron-emitting layer, provided that it can be fixed to the lower electrode layer located on the substrate. For example, the following methods can be employed: (1) a method using an electrically conductive adhesive to attach the electron-emitting material to the lower electrode layer provided on a substrate, (2) a method employing coating or printing a mixture (paste containing the electron-emitting material) obtained by mixing a powder obtained by comminuting the electron-emitting material with an organic binder on the lower electrode layer, and (3) a method of fabricating the electron-emitting material on the lower electrode layer and using it as is as the electron-emitting layer. Well-known or commercial products can be used for the above-mentioned electrically conductive adhesive, organic binder, or the like.

The electron-emitting element in accordance with the present invention can be driven by a method similar to that employed with the conventional electron-emitting elements. For example, the prescribed voltage may be applied to the control electrode layer and the lower electrode layer provided on the substrate. The voltage may be adjusted so that the electron-emitting layer be in an electric field with an electric field intensity of $1 \times 10^6$ V/m or more. In this case, it is typically preferred that the driving atmosphere be vacuum or a state close thereto. Furthermore, no limitation is placed on the driving temperature, but usually it is preferred that the driving temperature be set to about 0 to 60° C. Furthermore, the electric current may be a DC or pulsed (square wave) current.

<Embodiment 8>

Figure 8:
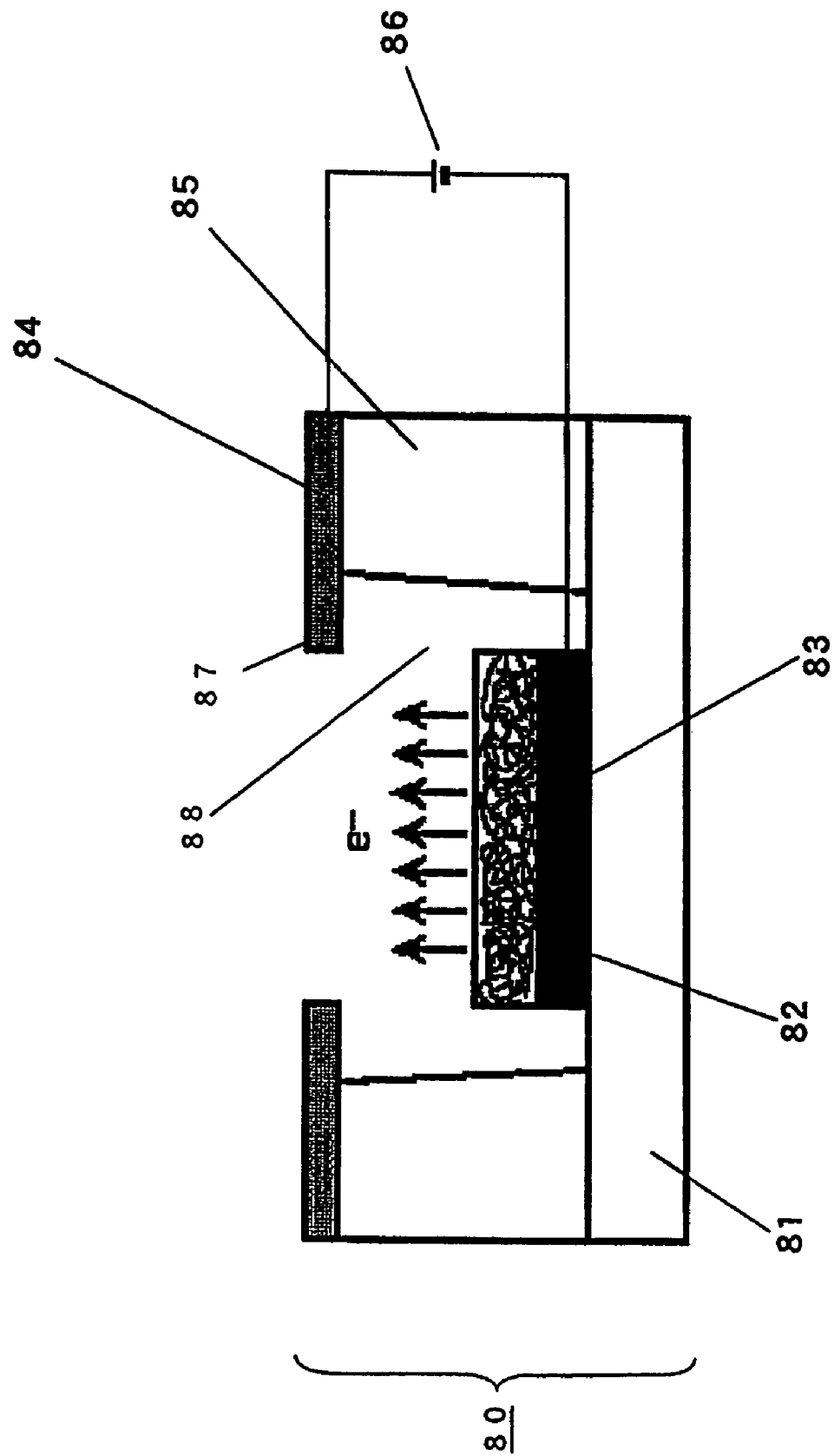
FIG. 8 is a schematic cross-sectional view of the electron-emitting element in accordance with the present invention.

FIG. 8 is a schematic cross-sectional view of the electron-emitting element in accordance with the present invention. An electron-emitting element 80 comprises a substrate 81, an electrode layer (lower electrode layer) 82, an electron-emitting layer 83 for emitting electrons, and insulator layer 85, and a control electrode layer 84 for applying a voltage (control power source 86) for electron emission, as the basic structural elements. Here, the electron-emitting layer 83 is composed of an electron-emitting material explained in relation to the embodiments or composite materials containing such electron-emitting material.

The electrode layer 82 and the electron-emitting layer 83 are formed on the substrate 81, and the control electrode layer 84 is disposed via the insulator layer 85 in the vicinity thereof. As shown in FIG. 8, the control electrode layer 84 was formed so as to surround the upper periphery of the electron-emitting layer 83, similarly to the gate electrode in a conventional Spindt-type electron-emitting element, but other implementations are also possible.

In the control electrode layer 84 formed on the insulating layer 85, part of the control electrode layer constituted a "protruding portion 87" which protruded from the insulating layer 85. Formation of the protruding portion is not essential and can be appropriately carried out if necessary. Referring to FIG. 8, a region 88 between the protruding portion and the electron-emitting layer is an empty space, but it may be also filled with an insulator.

Typically a glass substrate or quartz substrate can be advantageously used as the substrate 81. Furthermore, as described above, a low-resistance silicon substrate and electrically conductive substrate such as a metal substrate can be also used. When an electrically conductive substrate is used, the functions of the electrode layer 82 can be transferred to the electrically conductive substrate.

The electrode layer 82 is preferably from a metal material such as aluminum, titanium, chromium, nickel, copper, gold, and tungsten, or a structure obtained by laminating a metal and a low-resistance n-type semiconductor composed of silicon, gallium nitride, or the like. A structure obtained by laminating the aforementioned electrode layer and a resistive film may be used as the electrode layer 82 in order to stabilize the emission current. Typically it is preferred that the thickness of the electrode layer 82 be about 1 to 50 µm.

A porous body having an electron-emitting component in the skeleton can be used as the electron-emitting layer 83. A porous body having a fine pore size of several tens of nanometers is a representative structure. Furthermore, the electron-emitting layer 83 has a function of emitting electrons in vacuum under the effect of an electric field generated by the voltage applied to the control electrode layer 84. The material for the electron-emitting layer can be appropriately selected from the above-described materials.

The control electrode layer 84 is a layer having a function of providing an electric field to the electron-emitting layer 83 under applied voltage and controlling the amount of emitted electrons by the field intensity. This layer is formed on the insulator layer 85. The voltage is applied to the control electrode 84 connected to the positive electrode of a power source 86 and the electrode layer 82 connected to the negative electrode of a power source 86.

Referring to FIG. 8, the electron-emitting layer 83 is disposed adjacently to the control electrode layer 84 via the insulator layer 85, but it is also possible not to use the insulator layer 85, provided that the electron-emitting layer 83 and control electrode layer 84 are not in contact with each other.

Because the material in accordance with the present invention is used for the electron-emitting layer 83 in the electron-emitting element 80, an electric field concentration effect can be obtained with higher efficiency than in prior art. As a result, the applied voltage can be lower than in the conventional configurations.

2. Fluorescent Light-Emitting Element

The fluorescent light-emitting element in accordance with the present invention comprises an anode portion having a fluorescent layer and an electron-emitting element, the anode portion and electron-emitting element being disposed such that electrons emitted from the electron-emitting element induce light emission from the fluorescent layer, and is characterized in that the aforementioned electron-emitting element is the electron-emitting element of the present invention.

The fluorescent light-emitting element of the present invention uses the electron-emitting element in accordance with the present invention as the electron-emitting element. Elements that have been used in the well-known fluorescent light-emitting elements can be employed as other elements (container or housing and the like).

A laminate obtained by laminating a fluorescent layer, an anode electrode layer, and a substrate in the order of description from the electron-emitting element can be advantageously used as a basic configuration of the anode portion. The configuration of each layer and formation thereof may be within the framework of well-known technology.

When the emitted light is picked up from the front surface (anode portion), transparent materials that have been used in the well-known fluorescent light-emitting elements may be used for respective layers constituting the anode portion. For example, a glass substrate, quartz substrate, or the like can be used for the substrate. Indium tin oxide (ITO), tin oxide, zinc oxide, and the like can be used for the anode electrode layer.

The fluorescent layer may be appropriately formed according to the desired color of emission. Thus, the material for the fluorescent layer can be appropriately selected from fluorescent substances (compounds) according to the color which may include three primary colors, red (R), blue (B), and green (G), or intermediate colors. For example, red fluorescent substances such as $Y_2O_3$ systems and $GdBO_3$ systems, green fluorescent substances such as ZnS systems and ZnO systems, and blue fluorescent substances such as $Y_2SiO_5$ system and ZnS system can be used. As for the formation of the fluorescent layer, it may be formed as a thin film, for example, by printing or applying a solution or dispersion containing those fluorescent substances on top of the anode electrode layer.

The arrangement of the electron-emitting layer and anode portion (in particular, the fluorescent layer) may be such that light can be emitted due to collision of the electrons emitted from the electron-emitting layer with the fluorescent layer of the anode portion. It is preferred that the electron-emitting layer and anode portion (fluorescent layer) be disposed so as to face each other. It is also preferred than an empty space (in particular, vacuum) be provided between them. Furthermore, it is desired that the electron-emitting layer and fluorescent layer be disposed parallel to each other. The distance between the electron-emitting layer and fluorescent layer can be appropriately adjusted according to the desired performance typically within a range of from 100 µm to 2 mm.

<Embodiment 9>

Figure 9:
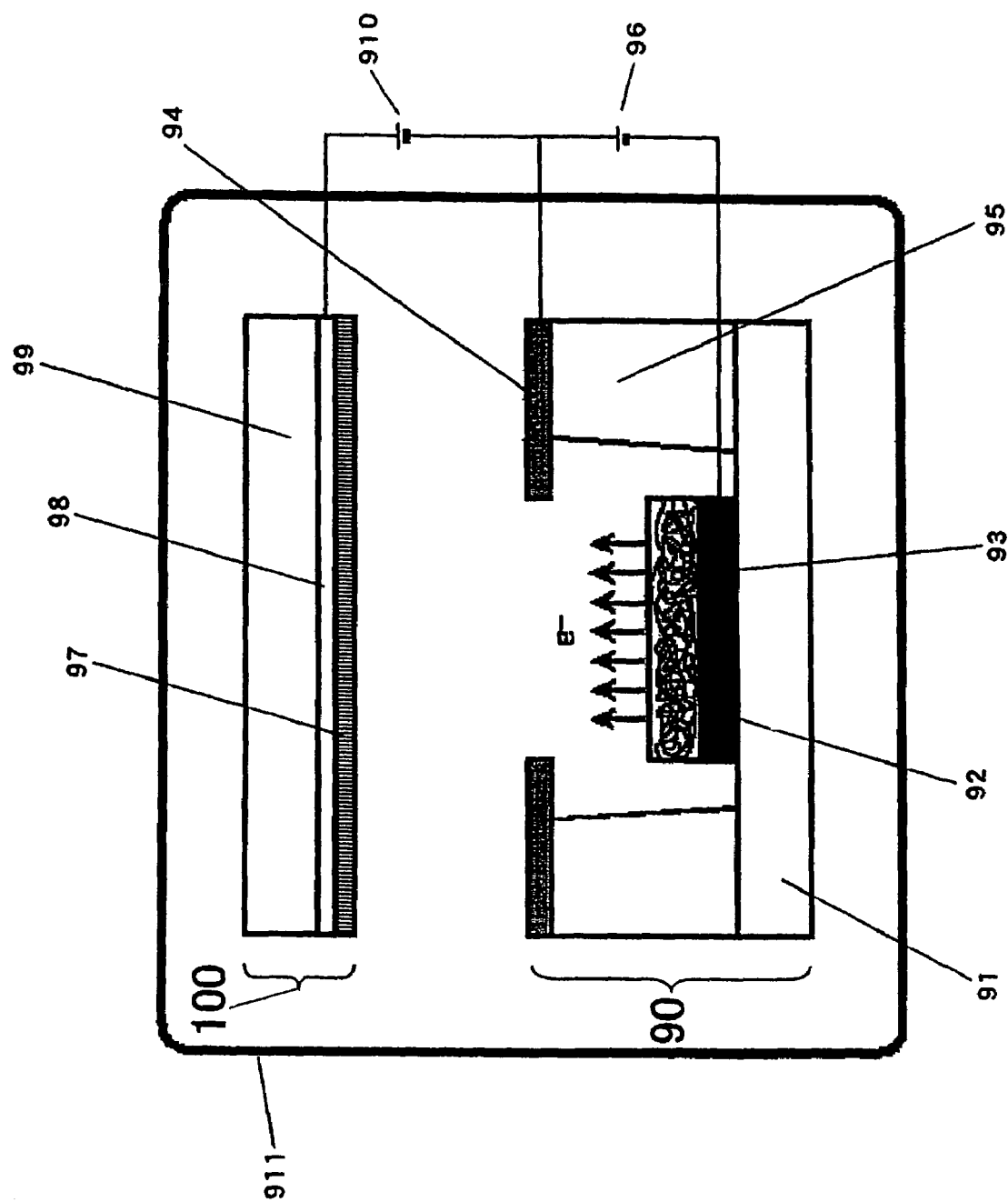
FIG. 9 is a schematic cross-sectional view of the fluorescent light-emitting element using the electron-emitting element.

FIG. 9 is a schematic cross-sectional view of the fluorescent light-emitting element in accordance with the present invention. This fluorescent light-emitting element comprises an electron-emitting element 90, an anode portion 100, and a housing 911 enclosing the aforementioned components as the basic structural elements.

As shown in FIG. 9, the electron-emitting element 90 and anode portion 100 are provided independently from the container 911. Alternatively, the anode portion may be directly formed on the inner surface of the housing. Similarly, the electron-emitting element can be directly formed on the inner surface of the housing. Furthermore, in another possible implementation, the electron-emitting element 91 and anode portion 100 are pasted together via a spacer, without using a housing, and the space therebetween is vacuum or in a state close thereto.

The anode portion 100 may be so disposed that the electrons e⁻ emitted from the electron-emitting layer 93 of the electron-emitting element 90 effectively are irradiated to with the fluorescent layer 97. As shown in FIG. 9, it is desirable that the fluorescent layer 97 and electron-emitting layer 93 be so disposed that they face each other via an empty space, while maintaining a mutually parallel arrangement.

The anode portion 100 has a function of conducting voltage application for accelerating the electrons that were emitted from the electron-emitting element and inducing light emission from the fluorescent substance. Structural elements thereof include a fluorescent layer 97/an anode electrode 98 for applying the accelerating voltage to emitted electrons/a front substrate 99. When the emitted light is picked up from the front substrate 99, ITO which is a transparent conductive film typically can be used as the anode electrode 98. Furthermore, glass or the like can be advantageously used as the front substrate 99.

The fluorescent material used in the fluorescent layer 97 may be appropriately selected from a variety of the above-mentioned fluorescent material according to the desired color of emitted light. In this case, it is preferred that a fluorescent material with the highest efficiency be selected by taking into account the energy value of the emitted electrons which are accelerated, that is, the anode voltage value.

3. Image Displaying Device

The image displaying device in accordance with the present invention is an image displaying device comprising an anode portion having a fluorescent layer and a plurality of two-dimensionally arranged electron-emitting elements, in which the anode portion and the electron-emitting element are so disposed that the electrons emitted from the electron-emitting element cause the fluorescent layer to emit light, wherein the electron-emitting element is the electron-emitting element in accordance with the present invention.

The image displaying device of the present invention uses the electron-emitting element in accordance with the present invention as an electron-emitting element. The elements that have been used in well-known image displaying devices can be used as other elements (a housing, a driver for driving, and the like).

A plurality of electron-emitting elements are arranged two dimensionally. Thus, the electron-emitting elements are arranged in the same plane and form an array of electron-emitting elements. A configuration having, for example, a plurality of electrode patterns which are electrically insulated and a plurality of control electrode patterns so arranged that they are perpendicular to the electrode patterns (that is, a matrix system) is convenient for such as array from the standpoint of manufacturing large-screen devices.

The configuration of the fluorescent layer of the fluorescent light-emitting element described in the item 2 above can be employed as the basic configuration of the fluorescent layer. The number of type of the fluorescent layer may be appropriately determined according to the number of pixels, size of the screen, and the like. The number of electron-emitting elements corresponding to one pixel differs depending on the desired emission brightness, but usually may be about 1 to 50.

In particular, when color images are displayed, individual fluorescent layers (one pixel) with three primary colors (RGB) as a set may be disposed on the anode electrode so as to correspond to respective electron-emitting elements. A variety of arrangement methods, e.g., longitudinal stripes, lateral stripes, and the like, can be employed for arranging the three primary colors. In case of color images, it is usually preferred that the number of electron-emitting elements corresponding to one pixel be about 1 to 100.

The layout of the anode portion comprising a fluorescent layer and the electron-emitting elements may be such as to allow for individual control of the amount of light emitted by each fluorescent layer by the electron emission dose from each electron-emitting element. In particular, a configuration is preferred in which the entire fluorescent layer of the anode portion or part thereof and the electron-emitting layer of the electron-emitting elements face each other, while a parallel state of the two layers is substantially maintained.

The driving method of the image displaying device in accordance with the present invention may be basically identical to that of the conventional field emission displays. For example, a drive may be attached to the electrode layer of electron-emitting elements and the control electrode layer and the prescribed voltage may be applied to the two layers.

<Embodiment 10>

Figure 10:
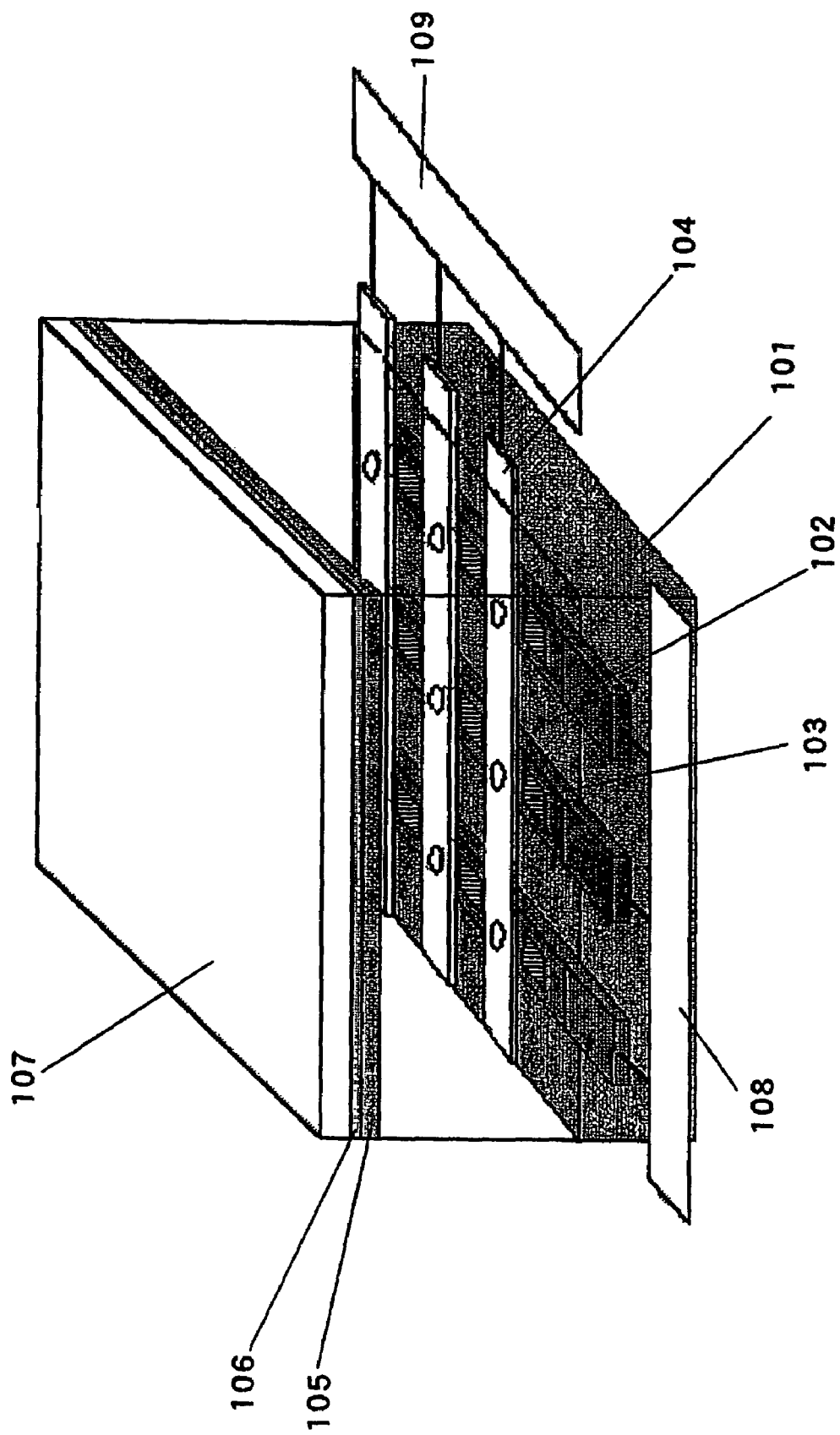
FIG. 10 is a cross-sectional perspective view of an image displaying device in which a plurality of electron-emitting elements are arranged two dimensionally.

FIG. 10 is a cross-sectional perspective view of an image displaying device in which a plurality of the electron-emitting elements shown in FIG. 8 or the like are arranged two dimensionally (in this figure, 3 rows×3 columns=9) and which comprises a fluorescent layer that emits light due to irradiation with the emitted electrons.

The method for displaying images with such a configuration is usually called a matrix drive system. The configuration has a lower electrode layer 102 formed as a band on the substrate 101. Further, the control electrode layer 104 for controlling the emission current quantity is formed as a plurality (three in FIG. 10) of bands. Those control electrode layers 104 are disposed so as to be perpendicular to the lower electrode layer 102, without contact with the lower electrode layer 102.

Drivers 108, 109 for driving are connected to each lower electrode layer and control electrode layer, respectively.

An electron-emitting layer 103 is formed on the lower electrode layer. The electron-emitting layer 103 is preferably disposed so as to be in the positions of the portions where the lower electrode layer and control electrode layer cross each other.

An anode portion having the same configuration as that of the anode portion of the fluorescent light-emitting element of the present invention is provided above the lower electrode layer 102 and control electrode layer 104. The anode portion has a configuration in which a fluorescent layer 105, an anode electrode layer 106, and a front substrate 107 are successively laminated in the order of description, starting from the electron-emitting layer.

Referring to FIG. 10, the fluorescent layer 105 constitutes 1 pixel. Therefore, there are a total of 9 electron-emitting layers 109 corresponding thereto. Alternatively, the fluorescent layer may be composed of a plurality of pixels.

If image data is inputted correspondingly to synchronization signals to the driving drivers 108, 109 when the image displaying device shown in FIG. 10 is driven, the electrons can be emitted with the described electron emission dose from the described electron-emitting surface (places where the electrode rows intersect). As a result, in each electron-emitting element, the emitted electrons will be accelerated by the voltage applied to the anode electrode 106 and electrons will be irradiated to the fluorescent layer 105, thereby displaying an image of any shape and any brightness.

According to the electron-emitting element in accordance with the present invention, a specific electron-emitting material is employed for the electron-emitting layer and the control electrode layer is disposed so as not to be in contact with the electron-emitting layer. Therefore, excellent electric field concentration effect etc. can be achieved.

Furthermore, the aforementioned electron-emitting material can be manufactured by the manufacturing method in accordance with the present invention in a manner easier than that when carbon nanotubes or the like are employed. Therefore, it is possible to provide an electron-emitting element which is less expensive than the electron-emitting element using carbon nanotubes.

The electron-emitting element in accordance with the present invention which demonstrates the above-described advantages is suitable for the production on an industrial scale.

The fluorescent light-emitting element and image displaying device of the present invention use the material in accordance with the present invention and the electron-emitting element in accordance with the present invention. Therefore, products demonstrating performance equal to that of the conventional products or superior thereto can be provided on a massive scale at a lower cost.

INDUSTRIAL APPLICABILITY

The electron-emitting element of the present invention demonstrates performance equal to that of the conventional products or superior thereto. Therefore it can be effectively employed in a variety of electronic devices using such elements. For example, it can be advantageously used in fluorescent light-emitting elements, image displaying devices (in particular, field emission displays) and the like. In the field of image displaying devices, it is suitable for the manufacture of large-screen displays.

EXAMPLES

Specific examples of the electron-emitting material and electron-emitting element in accordance with the present invention will be described hereinbelow. The Scope of the present invention is, however, not limited to those examples.

Example 1

A wet gel was prepared by using silica as an inorganic oxide. A starting material liquid was prepared by mixing tetramethoxysilane, ethanol, and aqueous ammonia solution (0.1N) at a respective molar ratio of 1:3:4. A solid silica wet gel was obtained by pouring the liquid into a mold of the prescribed shape and gelling.

Then, a carbon precursor containing wet gel was formed by coating a carbon precursor on the surface of the 3D-network skeleton in the silica wet gel. An aqueous solution of starting materials prepared by using water as a solvent and employing resorcinol (0.3 mol/L) formaldehyde, and sodium carbonate at a respective molar ratio of 1:2:0.01 was used as the carbon precursor. The aforementioned silica wet gel was immersed in the aqueous solution to impregnate the inside of the gel with the solution. The gel was then allowed to stay for 2 days at room temperature and at about 80° C. As a result, a carbon precursor containing wet gel was obtained in which the skeleton surface of the silica wet gel was coated with a polyphenolic polymer.

Then, the carbon precursor containing wet gel was dried. The drying treatment was carried out by replacing the solvent contained inside the wet gel with acetone and conducting supercritical drying. A carbon precursor containing dry gel was obtained by removing the solvent located inside. The dry gel was obtained by supercritical drying under the following conditions: carbon dioxide was used as a drying medium, drying was conducted for 4 hours under a pressure of 12 MPa at a temperature of 50° C., then pressure was gradually decreased, and the temperature was lowered after the atmospheric pressure was reached. The size of the gel was practically the same before and after the drying and almost no shrinkage was observed. The apparent density was about 220 kg/m$^3$ and the porosity was about 90%. Further, a high value of about 800 m$^2$/g of specific surface area was determined by measuring with the BET method.

Finally, an electron-emitting material composed of a carbon-containing porous body was obtained by carbonizing the carbon precursor containing dry gel. The dry gel was allowed to stay for 1 hour at a temperature of 100° C. in a nitrogen atmosphere, then allowed to stay for 1 hour at 200° C., allowed to stay for 1 hour at 300° C., allowed to stay for 1 hour at 400° C., allowed to stay for 1 hour at 500° C., then the temperature was inversely reduced at rate of 1 hour at 400° C., 1 hour at 300° C., 1 hour at 200° C., and 1 hour at 100° C., followed by gradual cooling to room temperature. In this process, the size of the dry gel before and after the carbonization was about 90% in the longitudinal direction. The apparent density was about 300 kg/m$^3$ and the porosity was about 80%. A high value of about 450 m$^2$/g of specific surface area was determined by measuring with the BET method.

The electron-emitting material (size: length about 2 mm, width about 2 mm, height about 1 mm) fabricated in the above-described manner was attached via an electrically conductive paste (trade name: Graphite Paste) to a metal electrode and the assembly was placed in a vacuum container. An anode electrode was then placed in a position about 1 mm above the electron-emitting material. The emission current intensity was then measured by applying a voltage between the metal electrode and a control electrode. As a result, it was found that the emission current was increased by one or more orders in magnitude compared to the conventional structure using a similar carbon material (more specifically, a carbon material fabricated by a similar process (a process of coating a carbon precursor and a heating process) on a metal substrate) that was not provided with pores and an emission current density of about 40 mA/cm$^2$ was obtained with respect to an anode voltage of about 3 kV.

Example 2

A dry gel was obtained by preparing a silica wet gel under the same conditions as in Example 1 and conducting drying of the gel in the same manner as in Example 1. A carbon-containing porous body was obtained by placing the silica dry gel into a quartz tubular furnace, causing propylene to flow therethrough at a temperature of about 800° C., and providing the surface of a porous skeleton with a carbon material in a vapor phase. Observations of the carbon-containing porous body thus obtained confirmed that a carbon film reaching the inside of the skeleton of the silica dry gel was formed. The size of the dry gel after the formation of carbon film was about 85% in the longitudinal direction, thereby confirming that shrinkage was suppressed. Furthermore, the apparent density was about 350 kg/m$^3$ and the specific surface area demonstrated a high value of about 450 m$^2$/g.

The electron-emitting material fabricated as described above was attached via an electrically conductive paste to a metal electrode and the assembly was placed in a vacuum container, in the same manner as in Example 1. An anode electrode was then placed in a space about 1 mm above the electron-emitting material and emission current was then measured by applying a voltage between the metal electrode and a control electrode. As a result, it was found that the emission current was increased by one or more orders in magnitude compared to the conventional structure using a similar carbon material that was not provided with pores as an emitter and an emission current density of about 40 mA/cm$^2$ was obtained with respect to an anode voltage of about 3 kV.

Example 3

A carbon precursor containing wet gel was prepared under the same conditions as in Example 1. A wet gel thus obtained was immersed in hydrofluoric acid for 30 minutes at room temperature to obtain a wet gel composed only of a carbon precursor. A carbon precursor containing dry gel was obtained by subjecting the carbon precursor containing wet gel to drying under the same conditions as in Example 1. The size of the gel before and after drying was practically the same.

Furthermore, an electron-emitting material composed of a carbon porous body was then obtained by carbonizing the carbon precursor containing dry gel under the same conditions as in Example 1. The size after carbonization shrunk to about 70% of the length, but the apparent density was as low as about 100 kg/m$^3$ and a high value of about 800 m$^2$/g of specific surface area was obtained. Observations conducted with an electron microscope confirmed that the carbon porous body had a hollow structure.

The electron-emitting material fabricated as described above was attached via an electrically conductive paste to a metal electrode and the assembly was placed in a vacuum container, in the same manner as in Example 1. An anode electrode was then placed in a space about 1 mm above the electron-emitting material and emission current quantity was then measured by applying a voltage between the metal electrode and a control electrode. As a result, it was found that the emission current was increased by one or more orders in magnitude compared to the conventional structure using a similar carbon material that was not provided with pores as an emitter and an emission current density of about 60 mA/cm$^2$ was obtained with respect to an anode voltage of about 3 kV.

Example 4

A carbon body was obtained by immersing the carbon-containing porous body fabricated in Example 2 in hydrofluoric acid for 30 minutes at room temperature and removing the skeleton portion thereof. The apparent density of the carbon porous body was as low as about 100 kg/m$^3$ and a high value of about 900 m$^2$/g of specific surface area was obtained. Observations conducted with an electron microscope confirmed that the carbon porous body had a hollow structure. This appears why a high specific surface area was obtained.

The electron-emitting material fabricated as described above was attached via an electrically conductive paste to a metal electrode and the assembly was placed in a vacuum container, in the same manner as in Example 1. An anode electrode was then placed in a space about 1 mm above the electron-emitting material and emission current quantity was then measured by applying a voltage between the metal electrode and a control electrode. As a result, it was found that the emission current was increased by one or more orders in magnitude compared to the conventional structure using a similar carbon material that was not provided with pores as an emitter and an emission current density of about 70 mA/cm$^2$ was obtained with respect to an anode voltage of about 3 kV.

Example 5

A wet gel in which a gel skeleton was covered with a carbon precursor was obtained by immersing the silica wet gel fabricated in Example 1 in a 5 wt. % acetonitrile solution of polyacrylonitrile. This gel was subjected to drying by the same method as described in Example 1.

An electron-emitting material composed of a carbon-containing porous body was obtained by treating the carbon precursor containing dry gel thus obtained for 2 hours at 200° C., then treating for 2 hours at 400° C., raising the temperature to 600° C., and then decreasing the temperature to 100° C. The size of the gel after the treatment became about 85%, in terms of the length, and shrinkage was confirmed to be suppressed. The apparent density was as low as about 350 kg/m$^3$ and a high value of about 450 m$^2$/g of specific surface area was obtained.

The electron-emitting material fabricated as described above was attached via an electrically conductive paste to a metal electrode and the assembly was placed in a vacuum container, in the same manner as in Example 1. An anode electrode was then placed in a space about 1 mm above the electron-emitting material and emission current quantity was then measured by applying a voltage between the metal electrode and a control electrode. As a result, it was found that the emission current was increased by one or more orders in magnitude compared to the conventional structure using a similar carbon material that was not provided with pores as an emitter and an emission current density of about 40 mA/cm$^2$ was obtained with respect to an anode voltage of about 3 kV.

Example 6

The carbon-containing porous body fabricated in Example 5 was immersed in an aqueous solution of sodium hydroxide with pH adjusted to 10 or more. An electron-emitting material composed of a carbon porous body was then obtained by replacing the solvent with acetone and conducting drying in the same manner as described in Example 1. The size in the lengthwise direction after treatment became about 90%. The apparent density was as low as about 120 kg/m$^3$ and a high value of about 800 m$^2$/kg of specific surface area was obtained.

The electron-emitting material fabricated as described above was attached via an electrically conductive paste to a metal electrode and the assembly was placed in a vacuum container, in the same manner as in Example 1. An anode electrode was then placed in a space about 1 mm above the electron-emitting material and emission current was then measured by applying a voltage between the metal electrode and a control electrode. As a result, it was found that the emission current was increased by one or more orders in magnitude compared to the conventional structure using a similar carbon material that was not provided with pores as an emitter and an emission current density of about 50 mA/cm$^2$ was obtained with respect to an anode voltage of about 3 kV.

Example 7

A polyamic acid synthesized from pyromellitic dianhydride and oxydianiline was used as a carbon precursor. A solution was prepared by dissolving with N-methyl pyrrolidone so that the concentration of the polyamic acid became 1 wt. %. A wet gel impregnated with the polyamic acid was obtained by immersing the silica wet gel fabricated in Example 1 into this solution. The wet gel containing polyamic acid that was thus obtained was imidized and converted into a dry gel by the following two methods.

With the first method, chemical imidization was carried out by immersing the wet gel containing polyamic acid in a pyridine solution of acetic anhydride. A polyimide-containing dry gel A was obtained by drying this polyimide-containing wet gel.

With the second method, a polyimide-containing dry gel B was obtained by drying the wet gel containing polyamic acid to obtain a dry gel and then conducting imidization by heating this dry gel in a nitrogen atmosphere at a temperature of 300° C.

The respective carbonized porous bodies were obtained by carbonizing the polyimide-containing dry gel A and B in a nitrogen atmosphere at a temperature of 600° C. Respective electron-emitting materials composed of carbon porous bodies were obtained by further heating the aforementioned carbon porous bodies at a temperature of 1200° C. and then evaporating the silica skeleton and enhancing graphitization at a temperature of 2000° C. or higher. Carbon porous bodies could be thus obtained in a similar manner from the dry gels A and B. By contrast with the carbon films obtained in the above-described examples, the carbon film thus obtained had a highly oriented graphitic structure.

The electron-emitting material fabricated as described above was attached via an electrically conductive paste to a metal electrode and the assembly was placed in a vacuum container, in the same manner as in Example 1. An anode electrode was then placed in a space about 1 mm above the electron-emitting material and emission current quantity was then measured by applying a voltage between the metal electrode and a control electrode. As a result, it was found that the emission current was increased by one or more orders in magnitude compared to the conventional structure using a similar carbon material that was not provided with pores as an emitter and an emission current density of about 90 mA/cm$^2$ was obtained with respect to an anode voltage of about 3 kV.

Example 8

An aqueous solution (concentration of silica component in the aqueous solution is 14 wt. %) with pH 9 to 10 was prepared by conducting electrodialysis of sodium silicate. After the pH value of the aqueous solution of silicic acid was adjusted to 5.5, the solution was placed in a container. A solidified silica wet gel was then obtained by gelling at room temperature. Then, the silica wet gel was subjected to hydrophobization in a 5 wt. % isopropyl alcohol solution of dimethyldimethoxysilane and a silica dry gel was thereafter obtained by conducting vacuum drying which is a usual drying method. The drying was conducted under the following conditions: holding for 3 hours at a temperature of 50° C. and a pressure of 0.05 MPa, then reducing pressure to atmospheric pressure and decreasing the temperature. The silica dry gel thus obtained had an apparent density of about 200 kg/m$^3$ and a porosity of about 92%. The value of specific surface area measured by the BET method was about 600 m$^2$/g. The average pore diameter of the silica dry gel was about 15 nm.

Then a carbon material was formed on the surface of the 3D-network skeleton of the silica dry gel thus obtained. The silica dry gel was placed in an apparatus for film deposition, an electric discharge plasma of benzene gas was obtained by high-frequency electromagnetic waves with a frequency of 13.56 MHz and a power of 200 W and an electron-emitting material composed of a carbon-containing porous body was obtained by forming a carbon film in the silica dry gel with a temperature adjusted to 200° C. The apparent density of this carbon-containing porous body was about 220 kg/m$^3$, and the shrinkage was found to be small. Furthermore, a high value of about 600 m$^2$/g of specific surface area was obtained according to the BET method.

The electron-emitting material fabricated as described above was attached via an electrically conductive paste to a metal electrode and the assembly was placed in a vacuum container, in the same manner as in Example 1. An anode electrode was then placed in a space about 1 mm above the electron-emitting material and emission current quantity was then measured by applying a voltage between the metal electrode and a control electrode. As a result, it was found that the emission current was increased by one or more orders in magnitude compared to the conventional structure using a similar carbon material that was not provided with pores as an emitter and an emission current density of about 40 mA/cm$^2$ was obtained with respect to an anode voltage of about 3 kV.

Example 9

After a silica dry gel was prepared by the same method as in Example 8, another carbon material was provided on the surface of the 3D-network skeleton thereof. The silica dry gel was placed in an apparatus for film deposition, plasma of a mixed gas of carbon monoxide and hydrogen was obtained by microwave radiation with a frequency of 2.45 GHz and a power of 300 W and an electron-emitting material composed of a carbon-containing porous body was obtained by forming a diamond film in the silica dry gel at a sample temperature of about 800° C. The apparent density of this carbon-containing porous body was about 220 kg/m$^3$, and the shrinkage was found to be small. Furthermore, a high value of about 600 m$^2$/g of specific surface area was obtained according to the BET method.

The electron-emitting material fabricated as described above was attached via an electrically conductive paste to a metal electrode and the assembly was placed in a vacuum container, in the same manner as in Example 1. An anode electrode was then placed in a space about 1 mm above the electron-emitting material and emission current was then measured by applying a voltage between the metal electrode and a control electrode. As a result, it was found that the emission current was increased by one or more orders in magnitude compared to the conventional structure using a similar carbon material that was not provided with pores as an emitter and an emission current density of about 40 mA/cm$^2$ was obtained with respect to an anode voltage of about 3 kV.

Example 10

In the above-described examples, a carbon material was used as the electron-emitting component, but it was confirmed that an emission current higher than that of the conventional structures could be similarly obtained with electron-emitting materials fabricated by coating a 3D-network skeleton with a material easily emitting electron, for example, boron nitride and metal compounds (barium oxide and the like).

In the above-described examples, a silica porous body was used as the electrically insulating porous skeleton structure, but it was confirmed that an emission current higher than that of the conventional structures could be similarly obtained with electron-emitting materials in which the 3D-network skeleton was formed from other porous materials for example alumina.

Further, in the above-described examples, a characteristic induced by an applied electric field was described as an electron emission characteristic, but the results obtained in evaluating thermionic emission characteristic by heating the electron-emitting materials obtained in the above-described examples confirmed that a thermionic emission effect could be induced at a temperature lower than that of the conventional structures.

Example 11

A method for the fabrication of the first electron-emitting element 80 shown in FIG. 8 will be described below.

A metal film was formed as an electrode layer 82 on one surface of a quartz substrate 81. The metal film was a tungsten film with a thickness of 2 µm, but the electrode material is not specifically limited to such a film.

Then, an electron-emitting layer 83 composed of a porous structure was formed. In the present example, a porous silica layer with a thickness of about 1 µm was formed by using a sol-gel method. More specifically, an aqueous solution (0.1N) containing tetramethoxysilane, ethanol, and ammonia at a molar ratio of 1:3:4 was prepared as a solution containing silica starting material. Then, after the adequate viscosity has been attained, this gel starting material solution was spin coated on a sample so as to obtain a thickness of 1 µm. In the present example, a porous silica layer with a thickness of about 1 µm was formed, but this thickness is not limiting. The preferred range for the thickness is generally from 0.1 µm to 10 µm, the specific value depending on the element structure.

Further, the sample obtained by forming the silica wet gel was washed (solution replacement) with ethanol and then a porous silica layer composed of a dry gel was obtained by conducting supercritical drying with carbon dioxide. The supercritical drying conditions were as follows: 4 hours under a pressure of 12 MPa at a temperature of 50° C., then pressure was gradually decreased, and the temperature was lowered after the atmospheric pressure was reached. The porosity of the porous silica layer composed of the dry gel thus obtained was about 92%. The average pore diameter was estimated to be about 20 nm according to the BET method. Finally, substances that were adsorbed in the porous layer were removed from the dried sample by conducting annealing at a temperature of 400° C. in a nitrogen atmosphere.

Then, an electron-emitting layer composed of a carbon material was formed as an electron-emitting component by forming a carbon precursor composed of polyimide by the above-described method and conducting baking at a temperature of about 800° C.

The electron-emitting element 80 with a structure shown in FIG. 8 was then fabricated by forming an insulating layer 85 composed of silica dioxide and an upper electrode serving as a control electrode 84 and using a typical lithography process.

The electron-emitting element 80 fabricated as described above was placed in a vacuum container, a voltage was applied between the electrode layer and the control electrode so that the control electrode served as a positive electrode, and an emission current was measured. As a result, an emission current density of about 80 mA/cm$^2$ which was 10 or more times larger than the conventional value was obtained.

Example 12

A paste containing an electron-emitting material was produced by grinding the electron-emitting material fabricated in Example 1 and mixing the comminuted material with a binder (isopropyl methacrylate). An electron-emitting element 80 such as shown in FIG. 8 was produced by applying the paste to the electrode layer by the ink-jet method and baking to remove the binder.

The electron-emitting element 80 fabricated as described above was placed in a vacuum container, a voltage was applied between the electrode layer and the control electrode so that the control electrode served as a positive electrode, and an emission current was measured. As a result, an emission current density of about 60 mA/cm$^2$ which was 10 or more times larger than the conventional value was obtained.

Example 13

In the above-described examples, electron-emitting elements were explained, but fluorescent light-emitting elements with controllable fluorescent emission dose can be obtained by arranging an anode portion having a fluorescent layer opposite those elements.

FIG. 9 is a schematic cross-sectional view of the fluorescent light-emitting element of the present embodiment. The fluorescent light-emitting element comprises a electron-emitting element 90 described in the examples, an anode portion 100, and a vacuum container 911 enclosing those two components as the basic structural elements.

In the element structure shown in FIG. 9, the electron-emitting element 90 and anode portion 100 are entirely contained in the vacuum container.

In the present example, the anode portion 100 was formed by laminating transparent conductive film (ITO) functioning as an anode electrode 98 on a front substrate 99 composed of glass and then applying a ZnS-type fluorescent material as a fluorescent layer 97.

The fluorescent light-emitting device fabricated as described above was placed in a vacuum container. A voltage was applied between the lower electrode and a control electrode, so that the control electrode served as a positive electrode, thereby emitting electrons from the electron-emitting element 91 into a vacuum region. At the same time, an accelerating voltage of 3 kV was applied to the anode electrode 98 and the emission current and fluorescent emission brightness were measured. The emission current density was 50 mA/cm$^2$ and an emission brightness of 800 cd/m$^2$ or more was obtained.

Example 14

In the present example, the explanation was conducted with respect to a single electron-emitting element, but it is also applicable to an image displaying device which is capable of displaying images or text by arranging a plurality of such electron-emitting elements to obtain a two-dimensional configuration and controlling the fluorescent emission dose for each element.

FIG. 10 is a cross-sectional perspective view of an image displaying device in which electron-emitting elements such as shown in FIG. 8 are two-dimensionally arranged (in this figure, 3 rows×3 columns=9). A method for displaying images by using this configuration is usually called a matrix drive system. Thus, a band-like lower electrode layer 102 formed on a substrate 101 and a similar band-like upper electrode serving as a control electrode layer 104 for controlling the emission current intensity are disposed along straight lines and respective drivers 108, 109 for driving are connected thereto. If image data is inputted in each driver according to synchronization signals, then electrons can be emitted in the desired electron emission quantity from the desired electron emission surface (places where the electrode rows intersect). Thus, an image of any desired shape and any desired brightness can be rendered by accelerating the emitted electrons in vacuum by the voltage applied to the anode electrode 106 in each electron-emitting element and illuminating the fluorescent layer 105 with the electrons.

The invention claimed is:

1. A method for manufacturing an electron-emitting material which emits electrons in an electric field, (1) the electron-emitting material being a porous body having a 3D-network structure skeleton, (2) the 3D-network structure skeleton being composed of an inner portion and a surface portion, (3) the surface portion comprising an electron-emitting component, (4) the inner portion being composed of (i) at least one of an insulating material and a semiinsulating material, (ii) an empty space, or (iii) an empty space and at least one of an insulating material and a semiinsulating material,
wherein the method comprises a step A of obtaining an electron-emitting material composed of a carbon-containing material by adding a carbon material to a gel of an inorganic oxide having a 3D-network structure skeleton.

2. The manufacturing method according to claim 1, further comprising a step of removing the inorganic oxide partially or entirely from the carbon-containing material.

3. The manufacturing method according to claim 1, wherein a dry gel is used as the gel of the inorganic oxide and the step of obtaining a porous body as the carbon-containing material by adding a carbon material to the dry gel is implemented as the step A.

4. The manufacturing method according to claim 1, wherein the electron-emitting material has an emission current density of 40 mA/cm² or more with respect to an anode voltage of 3 kv.

5. The manufacturing method according to claim 1, wherein the carbon material is produced by imparting energy to a starting material.

6. The manufacturing method according to claim 5, wherein the starting material is one or more of saturated hydrocarbon compounds, unsaturated hydrocarbon compounds, aromatic hydrocarbon compounds, alcohols, nitrogen-containing hydrocarbons, and carbon-containing gas.

7. A method for manufacturing an electron-emitting material which emits electrons in an electric field, (1) the electron-emitting material being a porous body having a 3D-network structure skeleton, (2) the 3D-network structure skeleton being composed of an inner portion and a surface portion, (3) the surface portion comprising an electron-emitting component, (4) the inner portion being composed of (i) at least one of an insulating material and a semiinsulating material, (ii) an empty space, or (iii) an empty space and at least one of an insulating material and a semiinsulating material,
wherein the method comprises a step B of obtaining an electron-emitting material composed of a carbon-containing material by adding a carbon precursor to a gel of an inorganic oxide having a 3D-network structure skeleton and carbonizing the carbon precursor containing gel thus obtained.

8. The manufacturing method according to claim 7, further comprising a step of removing the inorganic oxide partially or entirely from the carbon precursor containing gel.

9. The manufacturing method according to claim 7, wherein a wet gel is used as the gel of the inorganic oxide and a step of obtaining a porous body as the carbon-containing material by adding a carbon precursor to said wet gel and drying the carbon precursor containing gel thus obtained to obtain a carbon precursor containing dry gel, and then carbonizing said dry gel is carried out as the step B.

10. The manufacturing method according to claim 8, wherein a wet gel is used as the gel of the inorganic oxide and a step of obtaining a porous body as the carbon-containing material by adding a carbon precursor to said wet gel, removing the inorganic oxide partially or entirely from the carbon precursor containing gel thus obtained, and then carbonizing the obtained material is carried out as the step B.

11. The manufacturing method according to claim 7, wherein the carbon precursor contains an organic polymer.

12. The manufacturing method according to claim 8, wherein the carbon precursor contains one or more types of organic polymer.

13. The manufacturing method according to claim 11, wherein the organic polymer has one or more carbon-carbon unsaturated bonds.

14. The manufacturing method according to claim 11, wherein the organic polymer has one or more aromatic rings.

15. The manufacturing method according to claim 11, wherein the organic polymer is at least one of phenolic resins, polyimides, and polyacrylonitrile.

16. The manufacturing method according to claim 7, wherein the electron-emitting material has an emission current density of 40 mA/cm² or more with respect to an anode voltage of 3 kv.

* * * * *

UNITED STATES PATENT AND TRADEMARK OFFICE
CERTIFICATE OF CORRECTION

PATENT NO. : 7,163,429 B2 Page 1 of 1
APPLICATION NO. : 11/028329
DATED : January 16, 2007
INVENTOR(S) : Masahiro Deguchi et al.

It is certified that error appears in the above-identified patent and that said Letters Patent is hereby corrected as shown below:

On the title page of the Letters Patent,

Under section "(56) References Cited, U.S. PATENT DOCUMENTS", add:

--2002/171347 A1  11/2002  Hirasawa et al.
6,504,292 B1  1/2003  Choi et al.
6,538,367 B1  3/2003  Choi et al.
2004/43219 A1  3/2004  Ito et al.--

Signed and Sealed this

Fourteenth Day of August, 2007

JON W. DUDAS
*Director of the United States Patent and Trademark Office*